US012412255B2

(12) United States Patent
Fanello et al.

(10) Patent No.: US 12,412,255 B2
(45) Date of Patent: Sep. 9, 2025

(54) ENHANCED PHOTO RELIGHTING BASED ON MACHINE LEARNING MODELS

(71) Applicant: Google LLC, Mountain View, CA (US)

(72) Inventors: Sean Ryan Francesco Fanello, San Francisco, CA (US); Yun-Ta Tsai, Los Gatos, CA (US); Rohit Kumar Pandey, Mountain View, CA (US); Paul Debevec, Culver City, CA (US); Michael Milne, San Mateo, CA (US); Chloe LeGendre, Culver City, CA (US); Jonathan Tilton Barron, Alameda, CA (US); Christoph Rhemann, Marina Del Rey, CA (US); Sofien Bouaziz, Los Gatos, CA (US); Navin Padman Sarma, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 18/028,930

(22) PCT Filed: May 17, 2021

(86) PCT No.: PCT/US2021/032734
§ 371 (c)(1),
(2) Date: Mar. 28, 2023

(87) PCT Pub. No.: WO2022/072000
PCT Pub. Date: Apr. 7, 2022

(65) Prior Publication Data
US 2023/0360182 A1    Nov. 9, 2023

Related U.S. Application Data

(60) Provisional application No. 63/085,529, filed on Sep. 30, 2020.

(51) Int. Cl.
*G06T 5/92* (2024.01)
*G06T 7/60* (2017.01)
(Continued)

(52) U.S. Cl.
CPC ............... *G06T 5/92* (2024.01); *G06T 7/60* (2013.01); *G06T 7/70* (2017.01); *G06T 15/506* (2013.01);
(Continued)

(58) Field of Classification Search
CPC .... G06T 5/00; G06T 5/92; G06T 7/70; G06T 7/60; G06T 15/506; G06T 2200/24;
(Continued)

(56) References Cited

U.S. PATENT DOCUMENTS

| 11,585,931 B2 * | 2/2023 | Remelius ................ G01S 5/163 |
| 2015/0035440 A1 * | 2/2015 | Spero ..................... H05B 45/20 |
| | | 315/153 |

(Continued)

FOREIGN PATENT DOCUMENTS

WO    2020068158    4/2020

OTHER PUBLICATIONS

Agusanto et al., "Photorealistic rendering for augmented reality using environment illumination," Proceedings of the Second IEEE and ACM International Symposium on Mixed and Augmented Reality, Conference Paper, IEEE, 2023, 10 pages.
(Continued)

*Primary Examiner* — Wesner Sajous
(74) *Attorney, Agent, or Firm* — McDonnell Boehnen Hulbert & Berghoff LLP

(57) ABSTRACT

Apparatus and methods related to applying lighting models to images of objects are provided. An example method includes applying a geometry model to an input image to determine a surface orientation map indicative of a distri-
(Continued)

bution of lighting on an object based on a surface geometry. The method further includes applying an environmental light estimation model to the input image to determine a direction of synthetic lighting to be applied to the input image. The method also includes applying, based on the surface orientation map and the direction of synthetic lighting, a light energy model to determine a quotient image indicative of an amount of light energy to be applied to each pixel of the input image. The method additionally includes enhancing, based on the quotient image, a portion of the input image. One or more neural networks can be trained to perform one or more of the aforementioned aspects.

21 Claims, 20 Drawing Sheets

(51) Int. Cl.
  *G06T 7/70* (2017.01)
  *G06T 15/50* (2011.01)
(52) U.S. Cl.
  CPC ............. *G06T 2200/24* (2013.01); *G06T 2207/20081* (2013.01); *G06T 2207/20084* (2013.01); *G06T 2207/20092* (2013.01); *G06T 2207/20208* (2013.01); *G06T 2207/30201* (2013.01)
(58) Field of Classification Search
  CPC . G06T 2207/20081; G06T 2207/20084; G06T 2207/20092; G06T 2207/20208; G06T 2207/30201; G06T 5/008; G06T 11/001; G06T 11/60; G06K 9/4661; G06N 3/082; G06N 3/042–045; G06V 10/70; G06V 10/75
  See application file for complete search history.

(56) References Cited

U.S. PATENT DOCUMENTS

| | | | |
|---|---|---|---|
| 2015/0043806 | A1 | 2/2015 | Karsch et al. |
| 2017/0262962 | A1 | 9/2017 | Rad et al. |
| 2018/0253869 | A1* | 9/2018 | Yumer .................. G06T 11/60 |
| 2018/0359416 | A1 | 12/2018 | Hold-Geoffroy et al. |
| 2019/0164261 | A1 | 5/2019 | Sunkavalli et al. |
| 2019/0340810 | A1 | 11/2019 | Sunkavalli et al. |
| 2020/0074674 | A1 | 3/2020 | Guo et al. |
| 2020/0153385 | A1 | 5/2020 | Mncent et al. |
| 2020/0273237 | A1 | 8/2020 | Sunkavalli et al. |
| 2020/0311946 | A1 | 10/2020 | Price et al. |
| 2020/0372284 | A1 | 11/2020 | Rhemann et al. |

OTHER PUBLICATIONS

Devries et al. "Learning Confidence for Out-Of-Distribution Detection in Neural Networks," arXiv:1802.04865v1, Feb. 13, 2018, 12 pages.
Hu et al. "FC'4: Fully Convolutional Color Constancy with Confidence-Weighted Pooling," IEEE Conference on Computer Vision and Pattern Recognition, 2017, pp. 330-339, XP033249369.
International Searching Authority, International Search Report and Written Opinion mailed Jul. 29, 2019, issued in connection with International Patent Application No. PCT/US2019/025205, filed Apr. 1, 2019, 15 pages.
International Searching Authority, International Search Report and Written Opinion mailed on Jan. 25, 2022, issued in connection with International Patent Application No. PCT/US2021/029634, filed Apr. 28, 2021, 11 pages.
International Searching Authority, International Search Report and Written Opinion mailed on Jun. 28, 22, issued in connection with International Patent Application No. PCT/US2021/071986, filed Oct. 22, 2021, 15 pages.
Nestmeyer et al., "Learning Physics-guided Face Relighting under Directional Light," CVPR, 2020, 10 pages.
Pandey et al., "Total Relighting: Learning to Relight Portraits for Background Replacement," ACM Transactions on Graphics, 2021, 21 pages, vol. 40, No. 4, Article 1.
Sun et al., "Single Image Portrait Relighting," arXiv.1905.00824v1, ACM Trans. Graph, 2019, 12 pages, vol. 38, No. 4, Article 79.
Tsai et al., "Portrait Light: Enhancing Portrait Lighting with Machine Learning," Google Research, Blog, Dec. 11, 2020, 9 pages.
Wang et al., "Face Relighting from a Single Image under Arbitrary Unknown Lighting Conditions," IEEE Transactions on Pattern Analysis and Machine Intelligence, Nov. 2009, pp. 1968-1984, vol. 31, No. 11.
Wang et al., "Single Image Portrait Relighting via Explicit Multiple Reflectance Channel Modeling," ACM Transactions on Graphics, 2020, 13 pages, vol. 39, No. 6, Article 220.
Wen et al., "Face Relighting with Radiance Environment Maps," Proceedings of the 2003 IEEE Computer Society Conference on Computer Vision and Pattern Recognition, Jun. 2003, pp. 158-165, vol. 2.
Xu et al., "Deep Image-Based Relighting from Optimal Sparse Samples," ACM Transactions on Graphics, 2018, 13 pages, vol. 37, No. 4, Article 126.
Zhang et al., "Portrait Shadow Manipulation," arXiv:2005.008925v2, ACM Transactions on Graphics, 2020, 14 pages, vol. 39, No. 4, Article 78.
International Searching Authority, International Search Report and Written Opinion mailed on Sep. 8, 2021, issued in connection with International Patent Application No. PCT/US2021/023734, filed on May 17, 2021, 17 pages.
Shashua et al., "The Quotient Image: Class-Based Re-rendering and Recognition With Varying Illuminations," IEEE Transactions on Pattern Analysis and Machine Intelligence, IEEE Computer Society, USA, Feb. 2001, pp. 129-139, vol. 23, No. 2.
Wu et al., "One-shot Deep Neural Network for Pose and Illumination Normalization Face Recognition," 2016 IEEE Conference on Multimedia and Expo (ICME), IEEE, Jul. 2016, 6 pages.
Chen et al., "Live HDR+ and Dual Exposure Controls on Pixel 4 and 4a," Google AI Blog, Aug. 3, 2020, 8 pages.
Debevec et al., "Acquiring the Reflectance Field of a Human Face," SIGGRAPH 2000 Conference Proceedings, Jul. 2000, 12 pages.
Legendre et al., "Learning Illumination from Diverse Portraits," arXiv:2008.02396v1, Aug. 5, 2020, 14 pages.
Zhang, Richard, "Making Convolutional Networks Shift-Invariant Again," arXiv:1904.11486v2, Jun. 9, 2019.

* cited by examiner

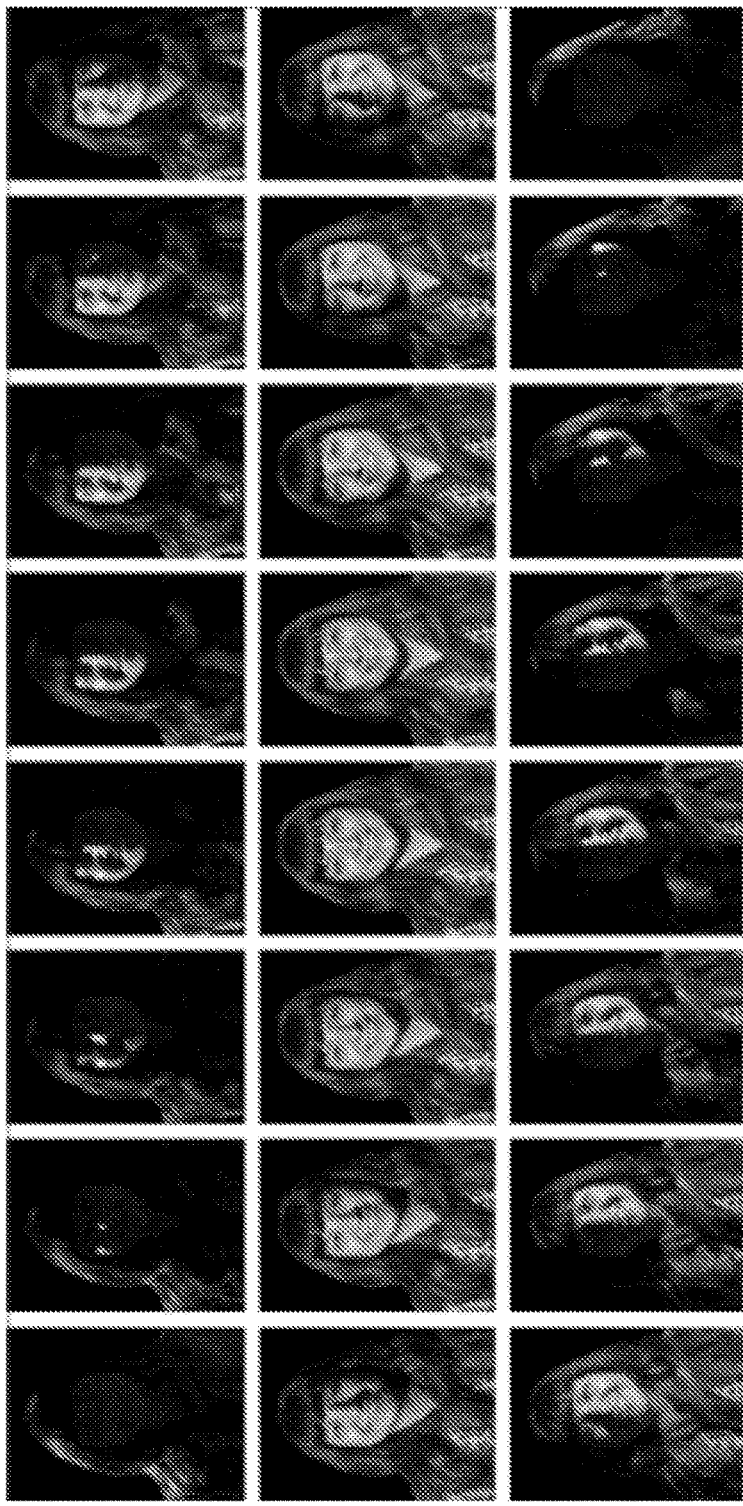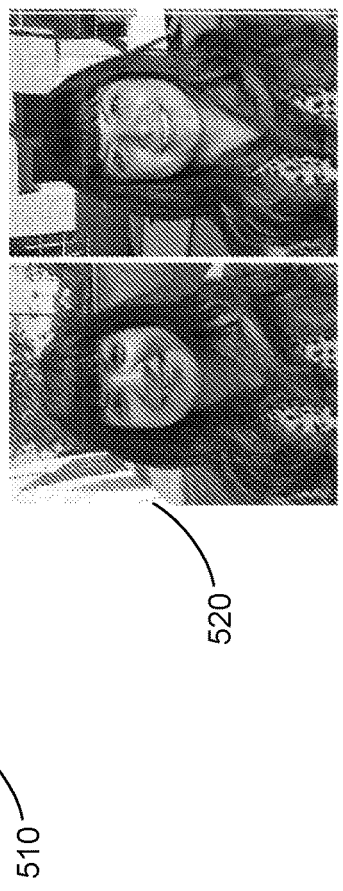
FIG. 5

2010 Apply, by a computing device, a geometry model to an input image to determine a surface orientation map indicative of a distribution of lighting on an object in the input image based on a surface geometry of the object

2020 Apply, by the computing device, an environmental light estimation model to the input image to determine a direction of synthetic lighting to be applied to the input image to enhance at least a portion of the input image

2030 Apply, by the computing device and based on the surface orientation map and the direction of synthetic lighting, a light energy model to determine a quotient image indicative of an amount of light energy to be applied to each pixel of the input image

2040 Enhance, based on the quotient image, the portion of the input image

FIG. 20

ENHANCED PHOTO RELIGHTING BASED ON MACHINE LEARNING MODELS

CROSS-REFERENCE TO RELATED APPLICATIONS/INCORPORATION BY REFERENCE

This application is a national stage application under 35 U.S.C. § 371 of International Application No. PCT/US2021/032734, filed May 17, 2021, which claims priority to U.S. Provisional Patent Application No. 63/085,529, filed on Sep. 30, 2020, which are hereby incorporated by reference in their entirety.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized.

Professional photographers, such as, for example, portrait photographers, leverage attributes of light on a subject to create compelling photographs of the subject. Such photographers often use specialized equipment, such as off-camera flashes and reflectors, to position lighting and illuminate their subjects to achieve a professional look. In some instances, such activity is performed in controlled studio settings, and involves expert knowledge of the equipment, lighting, and so forth.

Mobile phone users generally don't have access to such specialized portrait studio resources, or knowledge of how to use these resources. However, users may prefer to have access to the professional, high-quality results of seasoned portrait photographers.

SUMMARY

In one aspect, an image capture device may be configured to translate a professional photographer's understanding of light and use of off-camera lighting into a computer-implemented method. Powered by a system of machine-learned components, the image capture device may be configured to enable users to create attractive lighting for portraits or other types of images.

In some aspects, mobile devices may be configured with these features so that an image can be enhanced in real-time. In some instances, an image may be automatically enhanced by the mobile device. In other aspects, mobile phone users can non-destructively enhance an image to match their preference. Also, for example, pre-existing images in a user's image library can be enhanced based on techniques described herein.

In one aspect, a computer-implemented method is provided. A computing device applies the geometry model to an input image to determine a surface orientation map indicative of a distribution of lighting on an object in the input image based on a surface geometry of the object. The computing device applies an environmental light estimation model to the input image to determine a direction of synthetic lighting to be applied to the input image to enhance at least a portion of the input image. The computing device applies, based on the surface orientation map and the direction of synthetic lighting, a light energy model to determine a quotient image indicative of an amount of light energy to be applied to each pixel of the input image. The computing device enhances, based on the quotient image, the portion of the input image.

In another aspect, a computing device is provided. The computing device includes one or more processors and data storage. The data storage has stored thereon computer-executable instructions that, when executed by one or more processors, cause the computing device to carry out functions. The functions include: applying a geometry model to an input image to determine a surface orientation map indicative of a distribution of lighting on an object in the input image based on a surface geometry of the object; applying an environmental light estimation model to the input image to determine a direction of synthetic lighting to be applied to the input image to enhance at least a portion of the input image; applying, based on the surface orientation map and the direction of synthetic lighting, a light energy model to determine a quotient image indicative of an amount of light energy to be applied to each pixel of the input image; and enhancing, based on the quotient image, the portion of the input image.

In another aspect, an article of manufacture is provided. The article of manufacture includes one or more computer readable media having computer-readable instructions stored thereon that, when executed by one or more processors of a computing device, cause the computing device to carry out functions. The functions include: applying a geometry model to an input image to determine a surface orientation map indicative of a distribution of lighting on an object in the input image based on a surface geometry of the object; applying an environmental light estimation model to the input image to determine a direction of synthetic lighting to be applied to the input image to enhance at least a portion of the input image; applying, based on the surface orientation map and the direction of synthetic lighting, a light energy model to determine a quotient image indicative of an amount of light energy to be applied to each pixel of the input image; and enhancing, based on the quotient image, the portion of the input image.

In another aspect, a system is provided. The system includes means for applying a geometry model to an input image to determine a surface orientation map indicative of a distribution of lighting on an object in the input image based on a surface geometry of the object; means for applying an environmental light estimation model to the input image to determine a direction of synthetic lighting to be applied to the input image to enhance at least a portion of the input image; means for applying, based on the surface orientation map and the direction of synthetic lighting, a light energy model to determine a quotient image indicative of an amount of light energy to be applied to each pixel of the input image; and means for enhancing, based on the quotient image, the portion of the input image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 5 illustrates example images from a photographed reflectance field, in accordance with example embodiments.

FIG. 20 is a flowchart of a method, in accordance with example embodiments.

DETAILED DESCRIPTION

Figure 1:
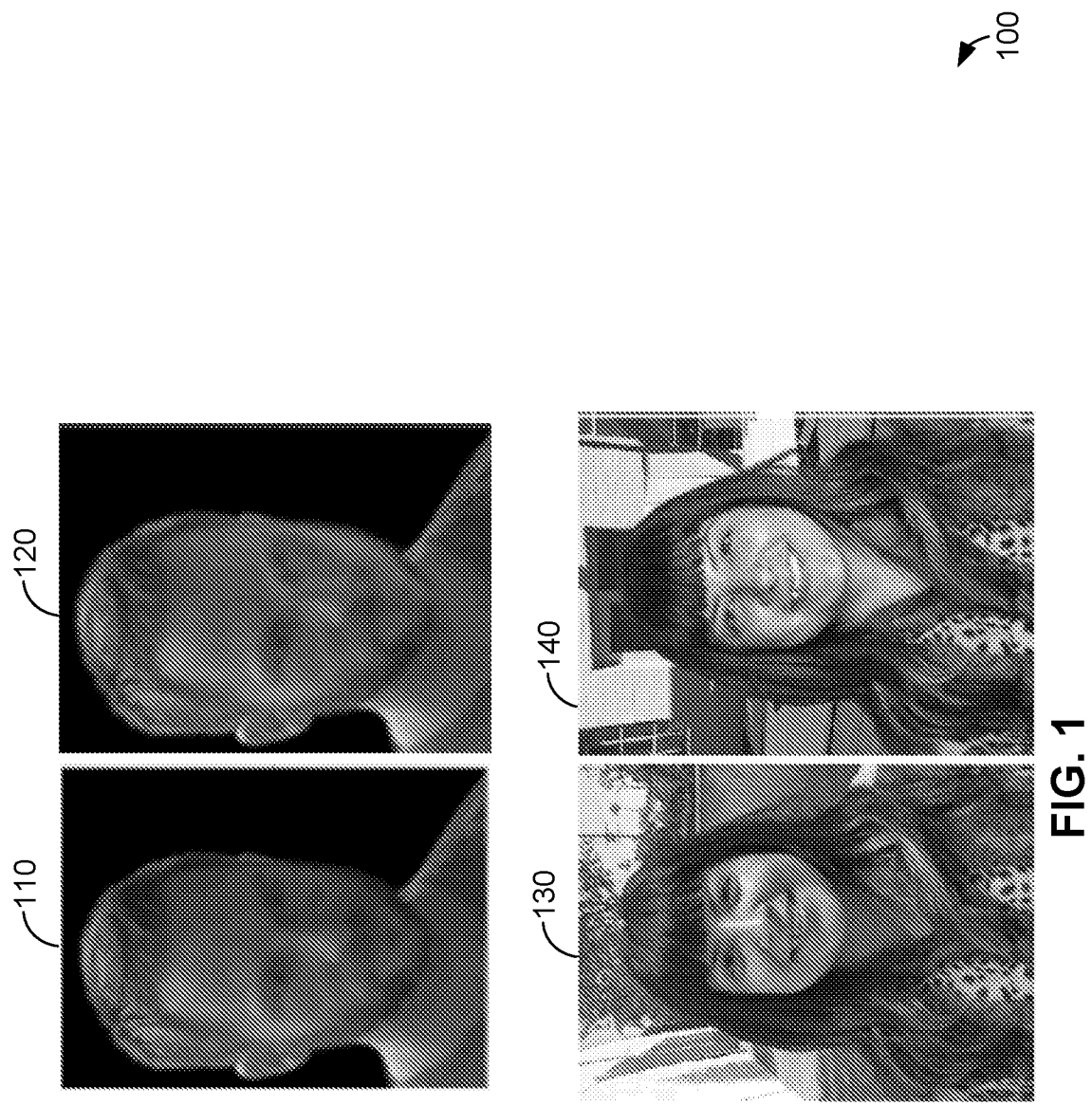
FIG. 1 illustrates images 100 with different lighting, in accordance with example embodiments.

This application relates to enhancing an image of an object, such as an object depicting a human face, using machine learning techniques, such as but not limited to neural network techniques. When a mobile computing device user takes an image of an object, such as a person, the resulting image may not always have ideal lighting. For example, the image could be too bright or too dark, the light may come from an undesirable direction, or the lighting may include different colors that give an undesirable tint to the image. Further, even if the image does have a desired lighting at one time, the user might want to change the lighting at a later time. As such, an image-processing-related technical problem arises that involves adjusting lighting of an already-obtained image.

To allow user control of lighting of images, particularly images of human faces, the herein-described techniques apply a model based on a convolutional neural network to adjust lighting of images. The herein-described techniques include receiving an input image and data about a particular lighting model to be applied to the input image, predicting an output image that applies the data about the particular lighting model to be applied to the input image using the convolutional neural network, and generating an output based on the output image. The input and output images can be high-resolution images, such as multi-megapixel sizes images captured by a camera of a mobile computing device. The convolutional neural network can work well with input images captured under a variety of natural and artificial lighting conditions. In some examples, a trained model of the convolutional neural network can work on a variety of computing devices, including but not limited to, mobile computing devices (e.g., smart phones, tablet computers, cell phones, laptop computers), stationary computing devices (e.g., desktop computers), and server computing devices. The convolutional neural network can apply the particular lighting model to an input image, thereby adjusting the lighting of the input image and solving the technical problem of adjusting the lighting of an already-obtained image.

A neural network, such as a convolutional neural network, can be trained using a training data set of images to perform one or more aspects as described herein. In some examples, the neural network can be arranged as an encoder/decoder neural network.

While examples described herein relate to determining and applying lighting models of images of objects with human faces, the neural network can be trained to determine and apply lighting models to images of other objects, such as objects that reflect light similarly to human faces. Human faces typically reflect light diffusely but can also include some specular highlights due to directly reflected light. For example, specular highlights can result from direct light reflections from eye surfaces, glasses, jewelry, etc. In many images of human faces, such specular highlights are relatively small in area in proportion to areas of facial surfaces that diffusely reflect light. Thus, the neural network can be trained to apply lighting models to images of other objects that diffusely reflect light, where these diffusely reflecting objects may have some relatively-small specular highlights (e.g., a tomato or a wall painted with matte-finish paint). The images in the training data set can show one or more particular objects using lighting provided under a plurality of different conditions, such as lighting provided from different directions, lighting provided of varying intensities (e.g. brighter and dimmer lighting), lighting provided with light sources of different colors, lighting provided with different numbers of light sources, etc.

A trained neural network can process the input image to predict the environmental illumination. An optimal light direction, that complements the existing portrait lighting of the input image, can be recommended based on the predicted environmental illumination. The trained relighting network can take the optimal light direction, a prediction of a surface geometry of an object in the input image, and a prediction of a quotient image indicative of an amount of light energy to be applied to each pixel of the input image. The trained neural network can also process the image to apply the desired lighting to the original image and predict an output image where the desired lighting has been applied to the input image from the recommended light direction. Then, the trained neural network can provide outputs that include the predicted output image.

In one example, (a copy of) the trained neural network can reside on a mobile computing device. The mobile computing device can include a camera that can capture an input image of an object, such as a portrait of a person's face. A user of the mobile computing device can view the input image and determine that the input image should be relit. The user can then provide the input image and the information on how the input image should be relit to the trained neural network residing on the mobile computing device. In response, the trained neural network can generate a predicted output image that shows the input image relit as indicated by the user and subsequently output the output image (e.g., provide the output image for display by the mobile computing device). In other examples, the trained neural network is not resident on the mobile computing device; rather, the mobile computing device provides the input image and the information on how the input image should be relit to a remotely-located trained neural network (e.g., via the Internet or another data network). The remotely-located convolutional neural network can process the input image and the information on how the input image should be relit as indicated above and provide an output image that shows the input image relit as indicated by the user to the mobile computing device. In other examples, non-mobile computing devices can also use the trained neural network to relight images, including images that are not captured by a camera of the computing device.

In some examples, the trained neural network can work in conjunction with other neural networks (or other software) and/or be trained to recognize whether an input image of an object is poorly lit. Then, upon a determination that an input image is poorly lit, the herein-described trained neural network could apply a corrective lighting model to the poorly-lit input image, thereby correcting the poor lighting of the input image. The corrective lighting model can be chosen based on user input and/or be predetermined. For example, a user input lighting model or a predetermined lighting model can be used to provide a "flat light" or light resembling the technique of "fill flash", or light the object with a lighting model that raises undesirable shadows on a face (e.g., from a backlit scene) with respect to the facial geometry, thus correcting flattening of the image.

In some examples, the trained neural network can take as inputs one input image and one or more lighting models and provide one or more resulting output images. Then, the trained neural network can determine the one or more resulting output images by applying each of the plurality of the lighting models to the input image. For example, the one or more lighting models can include a plurality of lighting models that represent one (or more) light source(s) that change location, lighting color, and/or other characteristics in each of the plurality of lighting models. More particularly, the plurality of lighting models could represent one or more light sources, where at least one light source changes location (e.g., by a predetermined amount) between provided models. In this approach, the resulting output images represent the input image shown as the changing light source(s) appear(s) to rotate or otherwise move about an object (or objects) depicted in the input image. Similarly, the changing light source(s) could change color (e.g., by a predetermined distance in a color space) between provided models so that the resulting output images represent the input image shown with a variety of colors of light. The plurality of output images could be provided as still images and/or as video imagery. Other effects could be generated by having the trained neural network apply a plurality of lighting models to one image (or relatedly, having the trained neural network apply one lighting model to a plurality of input images).

As such, the herein-described techniques can improve images by applying more desirable and/or selectable lighting models to images, thereby enhancing their actual and/or perceived quality. Enhancing the actual and/or perceived quality of images, including portraits of people, can provide emotional benefits to those who believe their pictures look better. These techniques are flexible, and so can apply a wide variety of lighting models to images of human faces and other objects, particularly other objects with similar lighting characteristics. Also, by changing a lighting model, different aspects of an image can be highlighted which can lead to better understanding of the object(s) portrayed in the image.

Techniques for Image Relighting Using Neural Networks

FIG. 1 illustrates images 100 with different lighting, in accordance with example embodiments. Images 100 include image 110 and image 120 depicting a human face of the same person under two different types of lighting. Image 110 is relit in accordance with example embodiments to obtain image 130, where the right side of the face in image 110 is illuminated. Image 130 is an image that includes a human face, where the lighting is dimmer than the lighting in image 140. Other examples of images with different lighting and/or other types of imperfect lighting are possible as well. Images 100 illustrate an impact of lighting on an image. For example, lighting can impact a perceived expression, a perceived mood, and/or other aspects of a subject's features and/or personality.

Relighting Network

A relighting network can be designed to computationally add an additional, repositionable light source into an image, with an initial lighting direction and an intensity automatically selected to complement original lighting conditions of the image. For example, under less-than-ideal original lighting conditions, for instance in backlit scenes, this additional light source improves exposure on the eyes and face. If the image already has compelling lighting, as is often the case for scenes with some directional illumination, the image can be gracefully enhanced for dramatic effect, for example, by accentuating contouring and shaping of a face or a person in the image.

Figure 2:
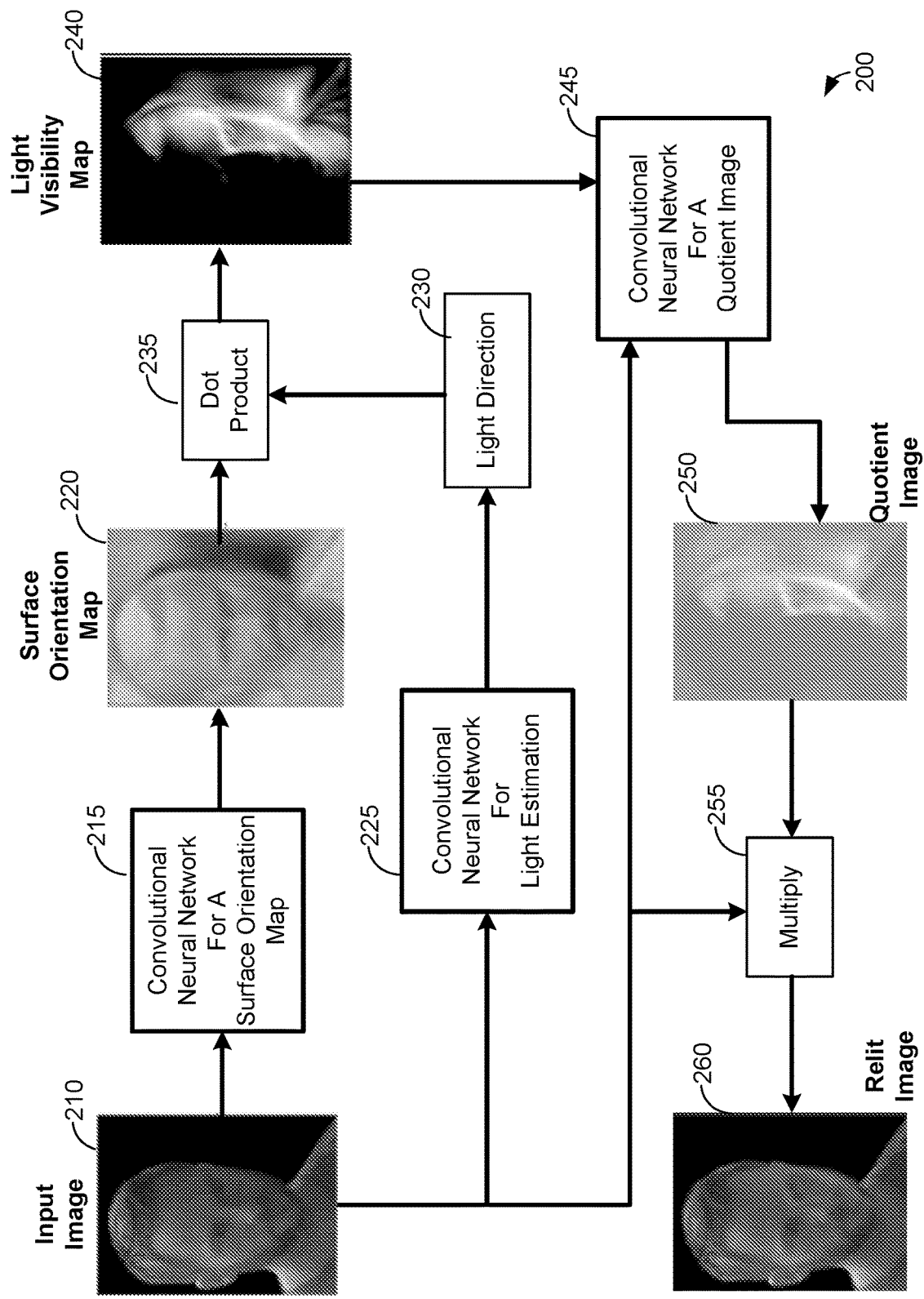
FIG. 2 is a diagram depicting a relighting network for enhancing lighting of images, in accordance with example embodiments.

FIG. 2 is a diagram depicting a relighting network 200 for enhancing lighting of images, in accordance with example embodiments. An input image 210 may be utilized by a first convolutional neural network 215 to generate a surface orientation map 220 indicative of a surface geometry of input image 200. Generally, when photographers add an additional light source into a scene, the orientation of the light source relative to the subject's facial geometry determines how much brighter each part of the face appears in the input image 210. In optics, based on Lambert's cosine law, an object composed of a relatively matte material reflects an amount of light proportional to the cosine of the angle between its surface orientation and the direction of the incident light. To model this behavior, the first convolutional neural network 215 is trained to estimate surface orientation from the input image 210. The output of the first convolutional neural network 215 is a colorized representation of a collection of 3-dimensional vectors in camera space.

For example, the spatial vector can be mapped to a colorized red-green-blue (RGB) surface orientation map 220. As illustrated, an original light source is illuminating a left side of the face in input image 210, there is less illumination on the right side of the face in input image 210, and the background and hair color are of a substantially darker color. In surface orientation map 220, the illuminated left side of the face corresponds to blue colored pixels, the background and hair color correspond to green colored pixels, and the less illuminated right side of the face corresponds to red colored pixels.

In some aspects, a second convolutional neural network 225 is trained to estimate the environmental lighting corresponding to the input image 210. For example, in order to recommend an optimal light direction, a second convolutional neural network 225 is trained to estimate a high dynamic range, omnidirectional illumination profile for a scene based on an input portrait. This lighting estimation model can infer the direction, relative intensity, and color of all light sources coming from all directions, in the scene in input image 210, by considering the face to be a light probe. The environment light estimation is then utilized to automatically determine an optimal light direction 230 for the relighting network 200. In some aspects, a pose of a portrait's subject may be estimated to determine an optimal light direction 230. Also, for example, labeled image data may be generated that associates different positions of light sources with optimal light placements for images, and a machine learning model may be trained on the labeled data to automatically determine light direction 230. For example, in studio portrait photography, a main off-camera light source, or "key-light" is often placed about 30° above the eye-line of a subject, and between 30° and 60° off the camera axis when looking overhead at the subject. Relighting network 200 can be configured to follow a similar guideline for a classical portrait look, thereby enhancing pre-existing lighting directionality in input image 210 while targeting a balanced, subtle key-to-fill lighting ratio of about 2:1.

As previously described, input image 210 indicates that the right side of the face is less illuminated than the left side of the face. Accordingly, in some embodiments, relighting network 200 can automatically determine light direction 230 to illuminate this less illuminated right side of the face. In some embodiments, relighting network 200 can receive a user preference of a light direction 230 via an interactive graphical user interface.

Based on Lambert's cosine law, a dot product 235 may be computed between a three dimensional vector representation of surface orientation map 220 and a three dimensional vector representation of light direction 230, to generate light visibility map 240. Generally, light visibility map 240 is indicative of regions in a portrait that are to be illuminated via synthetic lighting. For example, light visibility map 240 indicates portions of input image 200 where light can be seen and where light cannot be seen based on surface orientation. As previously described, input image 210 indicates that the right side of the face is less illuminated than the left side of the face, and relighting network 200 can automatically determine light direction 230 to illuminate this less illuminated right side of the face. Also, for example, surface orientation map 220 takes into account a surface geometry of the face in input image 200 to highlight portions, in red colored pixels, where environmental lighting does not provide adequate illumination. Accordingly, based on light direction 230 and surface orientation map 220, light visibility map 240 indicates the right side of the face as the portion that requires illumination.

When enhancing input image 210 in near real-time, it is beneficial to decrease utilization of computing resources, including for example, processing time, processing speed, and memory allocation. Specifically, it may not be desirable to directly utilize light visibility map 240 to enhance input image 210. The light visibility map 240 indicates areas of input image 210 that need to be illuminated and how much of the light illuminates these areas, but light visibility map 240 does not capture material properties of the object that is being relit. Depending on the material of the object being relit, the same light may lead to very different results e.g. shiny/specular materials vs dull/diffuse materials reflect light very differently.

Instead, light visibility map 240 and input image 210 can be input to third convolutional neural network 245, to predict a quotient image 250. The quotient prediction network 245 has to learn properties of skin, eyes, even materials on clothing from training data, and produce a quotient image 250 that takes into account both the material properties learned from the input image 210, and the optimized light direction and geometry information provided by the light visibility map 240. Generally, quotient image 250 is a per pixel real-valued, multiplicative factor indicating an amount of illumination to be applied to each pixel of input image 210. This may be further supervised with a ground truth image. Because quotient image 250 is a multiplicative factor, it does not dampen details from the original input image 210. For example, even at a much lower resolution, such as for blurry images, quotient image 250 can be predicted. On the other hand, processing the high resolution input image 210 may involve more computational complexity, causing delays in real-time processing. Generally, details in a high resolution input image 210 can be preserved, while enhancing input image 210 to bring out less visible aspects, thereby outputting a realistic image. The multiplier in quotient image 250 makes a given pixel lighter or darker. The range of values may vary, sometimes 10×, depending on an intensity of the synthetic illumination. Quotient image 250 enhances low-frequency lighting changes, without impacting high-frequency image details, which are directly transferred from input image 210 to maintain image quality. In some aspects, post-processing can be applied to quotient image 250 to adjust highlighting, exposure adjustment, and matting, thereby rendering a photorealistic image enhancement.

Multiplication 255 of quotient image 250 and input image 210 generates relit image 260. This method is also computationally efficient, as third convolutional neural network 245 predicts a lower-resolution quotient image that is upsampled prior to multiplication 255 with the high-resolution input. Accordingly, relighting network 200 combines surface geometry, and an automatic estimation of light direction, to generate relit image 260, where high frequency details of input image 210 are preserved, and low frequency details of input image 210 are enhanced. In some aspects, relighting network 200 can be optimized to run at interactive frame-rates on mobile devices, with a total model size under 10 MB. The results can be produced with a version of a UNet model that utilizes a combination of standard and separable, depth-wise convolutions, and concatenations for skip connections. This, along with float 16 quantization, can lead to a model size of 2.4 MB per UNet, and thus a total model size of 4.8 MB.

An interactive user experience may be provided where a user can adjust light position and brightness. This provides additional creative flexibility to users to find their own balance between light and shadow. Also, for example, aspects of relighting network 200 can be applied to existing images from a user's photo library. For example, for existing images where faces may be slightly underexposed, relighting network 200 can be applied to illuminate and shape the face. This may especially benefit images with a single individual posed directly in front of the camera.

Several aspects of relighting network 200 are described in greater detail below. For example, relighting network 200 can take an input image 210, and without any prior knowledge of cameras, exposures, compositions, and without any additional photographic hardware equipment, relighting network 200 can derive the geometry, lighting, and find an optimal exposure to enhance input image 210. Based on an estimation of original lighting in the input image 210, relighting network 200 can automatically deduce an optimal light direction for synthetic lighting. Combining the optimal light direction with a knowledge of surface geometry customizes an application of the synthetic lighting to geometric features of an object in input image 210. Also, for example, using a per pixel multiplicative factor to maintain high frequency details of the input image, while enhancing low frequency lighting details, is a significant factor in reducing computational complexity of image enhancement techniques. Further post-processing techniques to adjust highlighting, exposure adjustment, and matting, enable rendering of a photorealistic image enhancement. Intermediate interpretable outputs, such as, for example, surface orientation map 220, light direction 230, light visibility map 240, and quotient image 250, provide opportunities to optimize loss functions for neural networks, improve image quality, and otherwise make intermediate adjustments that inform the overall quality of the enhanced image. For example, surface orientation map 220 can be utilized to identify sources of error, and ground truth data may be updated with additional input from photographic techniques (e.g., adjustments made by professional photographers) to correct the errors. An interactive user experience, where a user can adjust light position and brightness for any image, is another significant feature of techniques described herein.

Surface Orientation Map—Supervising Relighting with Geometry Estimation

Figure 3:
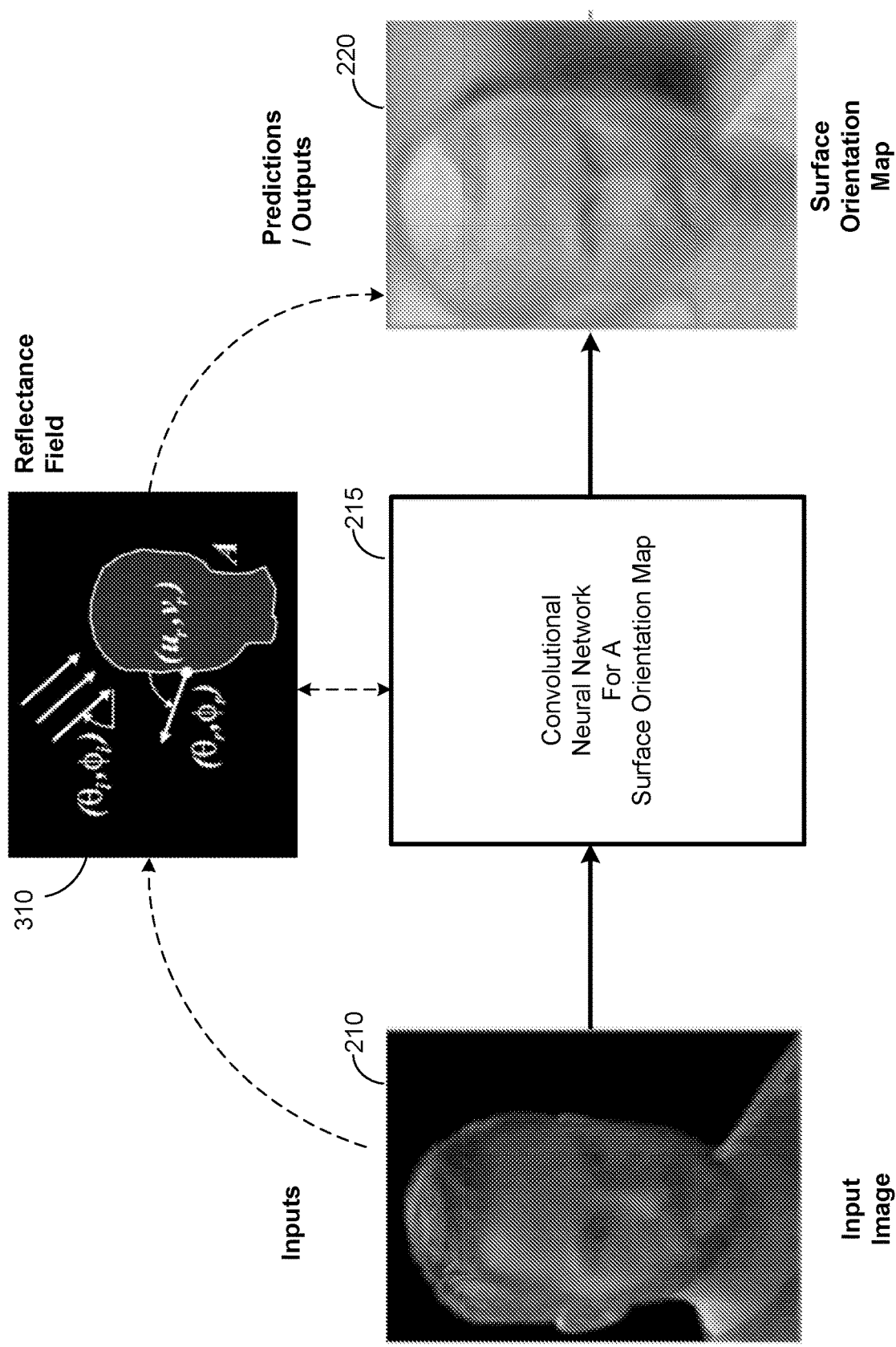
FIG. 3 is a diagram depicting an example network to predict a surface orientation map, in accordance with example embodiments.

FIG. 3 is a representation of an example network to predict a surface orientation map, in accordance with example embodiments. For example, a convolutional neural network 215 may take input image 210, infer a reflectance field 310 indicative of a surface geometry of an object in input image 210 (e.g., a face in a portrait, and/or an entire body in the input image 210). Based on ground truth data indicative of correlations between lighting and surface geometry, convolutional neural network 215 can predict surface orientation map 220. As described herein, surface orientation map 220 can be combined with one or more aspects of relighting network 200 to generate relit image 260. Also, for example, additional or alternative methods for ground truth geometry/surface orientation can be applied, such as, for example, data from depth sensors. In some example embodiments, depth from a mobile phone depth sensor can be used to determine a surface orientation map 220, instead of using a network (e.g., convolutional neural network 215).

A four-dimensional reflectance field 310, $R(u, v, \theta, \phi)$, may represent a subject lit from any lighting direction $(\theta, \phi)$ for each image pixel$(u, v)$, according to the light data. Generally, reflectance field 310 describes how a volume of space enclosed by a surface A transforms a directional illumination $(\theta_i, \phi_i)$ into a radiant field of illumination $R(\theta_r, \phi_r, u_r, v_r)$ at a point $(u_r, v_r)$. The light data represents one of a specified number of directions from which a face is illuminated for a portrait used in the image training data to train convolutional neural network 215.

While examples described herein relate to determining and applying lighting models of images of objects with human faces, convolutional neural network 215 can be trained to determine and apply lighting models to images of other objects, such as objects that reflect light similarly to human faces. Human faces typically reflect light diffusely but may include some specular highlights due to directly reflected light. For example, specular highlights can result from direct light reflections from eye surfaces, glasses, jewelry, etc. In many images of human faces, such specular highlights are relatively small in area in proportion to areas of facial surfaces that diffusely reflect light. Thus, convolutional neural network 215 can be trained to apply lighting models to images of other objects that diffusely reflect light, where these diffusely reflecting objects may have some relatively-small specular highlights (e.g., a tomato or a wall painted with matte-finish paint). The images in the training data set can show one or more particular objects using lighting provided under a plurality of different conditions, such as lighting provided from different directions, lighting provided of varying intensities (e.g. brighter and dimmer lighting), lighting provided with light sources of different colors, lighting provided with different numbers of light sources, etc. Once trained, convolutional neural network 215 can receive an input image 210 and information about original lighting. The trained convolutional neural network 215 can process the input image 210 to determine a prediction of lighting based on surface geometry, thereby generating surface orientation map 220.

Figure 4:
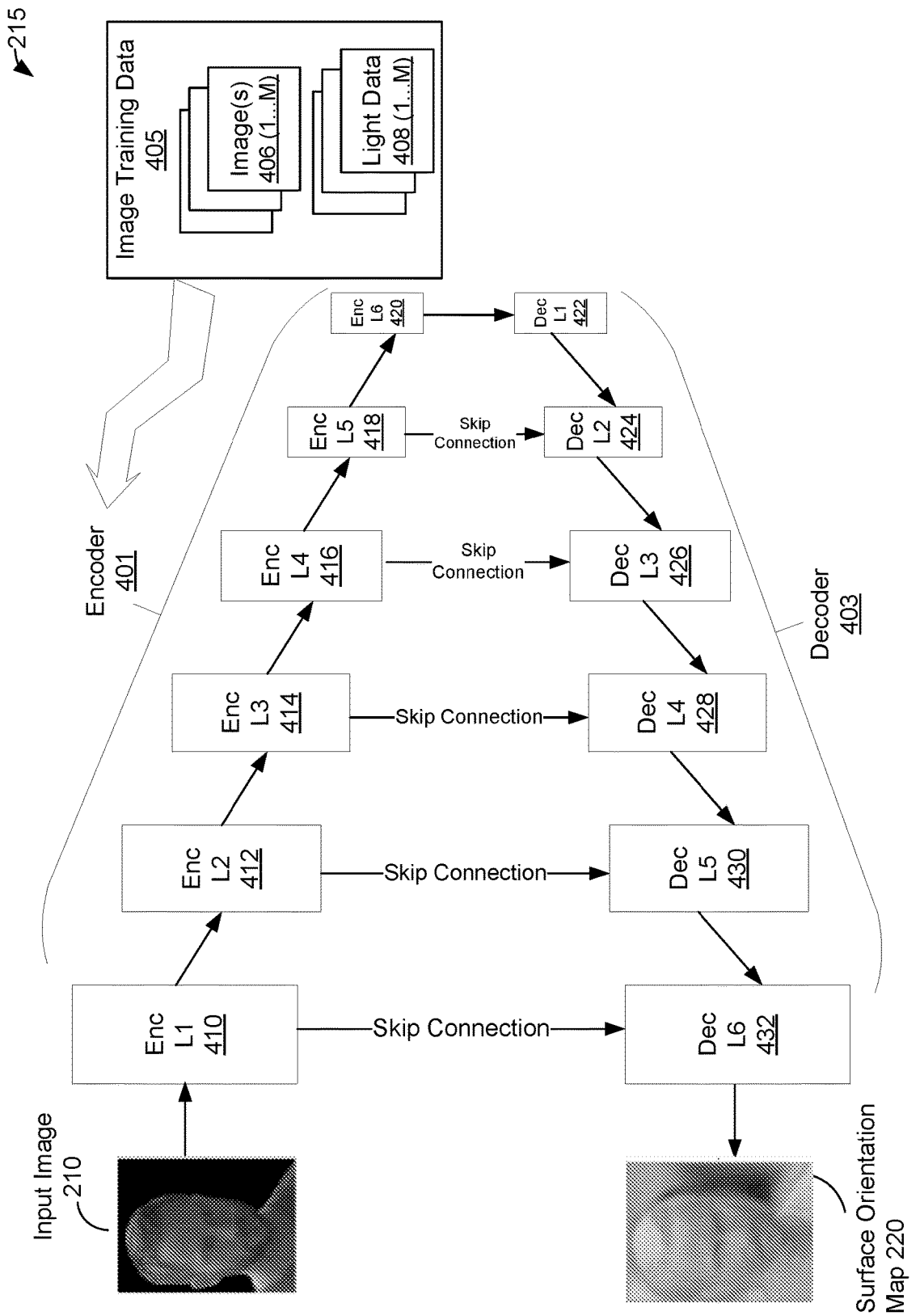
FIG. 4 is an example architecture for a neural network to predict a surface orientation map, in accordance with example embodiments.

FIG. 4 is an example architecture for a neural network to predict a surface orientation map, in accordance with example embodiments. For example, convolutional neural network 215 can be modeled around a UNet with skip connections. In some embodiments, the input image 210 can be of size (256×192×3) and can go through 6 encoder blocks, Enc L1 410, Enc L2 412, Enc L3 414, Enc L4 416, Enc L5 418, and Enc L6 420, and 6 decoder blocks, Dec L1 422, Dec L2 424, Dec L3 426, Dec L4 428, Dec L5 430, and Dec L6 432. Each encoder block of encoder 401 consists of a single convolution followed by downsampling by a factor of 2 followed by a blur-pooling operation. Each decoder block of decoder 403 consists of a single convolution followed by upsampling by a factor of 2 followed by a bilinear upsampling operation. Skip connections from the encoder 401 are concatenated or added to the upsampled features of decoder 403 depending on the network version. In some example embodiments, filters for encoder 401 may include (16, 32, 64, 128, 256, 256) filters for the encoder blocks yielding a final bottleneck size of (4×3×256). Similarly, filters for decoder 403 may include (256, 256, 128, 64, 32, 16) features to return back to the (256×192) image resolution. A final convolution with 3 filters can be used to produce surface orientation map 220 from the decoder output. Relu activations can be used after all convolutions.

The image training data 405 represents a set of portraits of faces photographed with various lighting arrangements. In some implementations, the image training data 405 includes images of faces, or portraits, formed with high-dynamic range (HDR) illumination recovered from low-dynamic range (LDR) lighting environment capture. As shown in FIG. 4, the image training data 405 includes multiple images 406(1), . . . 406(M), where M is the number of images in the image training data 405. Each image, such as, image 406(1) includes light data 408(1) and may also include pose data.

The light data 408(1 . . . M), based on ground truth data collection, represents one of a specified number (e.g., 331) of directions from which a face is illuminated for a portrait used in the image training data 405. In some implementations, the light data 408(1) includes a polar angle and an azimuthal angle, i.e., coordinates on a unit sphere. In some implementations, the light data 408(1) includes a triplet of direction cosines. In some implementations, the light data 408(1) includes a set of Euler angles. In some implementations, the angular configuration represented by the light data 408(1) is one of 331 configurations used to train convolutional neural network 215.

In some implementations, to photograph a subject's reflectance field, a computer-controllable sphere of white LED light sources can be used with lights spaced 120 apart at the equator. In such implementations, the reflectance field is formed from a set of reflectance basis images, photographing the subject as each of the directional LED light sources is individually turned on one-at-a-time within the spherical rig. Such One-Light-at-a-Time (OLAT) images are captured for multiple camera viewpoints. In some implementations, the 331 OLAT images are captured for each subject using six color machine vision cameras with 12-megapixel resolution, placed 1.7 meters from the subject, although these values and number of OLAT images and types of cameras used may differ in some implementations. In some implementations, cameras are positioned roughly in front of the subject, with five cameras with 35 mm lenses capturing the upper body of the subject from different angles, and one additional camera with a 50 mm lens capturing a close-up image of the face with tighter framing.

In some implementations, reflectance fields for 70 diverse subjects are used, each subject performing ten different facial expressions and wearing different accessories, yielding about 700 sets of OLAT sequences from six different camera viewpoints, for a total of 4200 unique OLAT sequences. Other quantities of sets of OLAT sequences may be used. Subjects spanning a wide range of skin pigmentations were photographed. Also, for example, 32 custom high resolution (e.g., 12 MP) depth sensors may be used. As another example, 62 high resolution (e.g., 12 MP) RGB cameras can be used. Together, over 15 million images may be generated as image training data 405.

As acquiring a full OLAT sequence for a subject takes some time, e.g., around six seconds, there may be some slight subject motion from frame-to-frame. In some implementations, an optical flow technique is used to align the images, interspersing occasionally (e.g., at every 11th OLAT frame) one extra "tracking" frame with even, consistent illumination to ensure the brightness constancy constraint for optical flow is met. This step may preserve the sharpness of image features when performing the relighting operation, which linearly combines aligned OLAT images.

FIG. 5 illustrates example images from a photographed reflectance field, in accordance with example embodiments. For example, a spherical lighting rig can include 64 cameras with different viewpoints and 331 individually-programmable LED light sources. As illustrated in FIG. 5, each individual can be photographed as illuminated OLAT by each light, forming a reflectance field (e.g., reflectance field 310 of FIG. 3). Images 510 depict an individual's appearance as illuminated by tiny cones of the 3600 environment. The reflectance field 310 encodes unique colors and light-reflecting properties of each individual's skin, hair, and clothing. For example, reflectance field 310 encodes information on how shiny or dull each material appears. Due to the superposition principle for light, these OLAT images can then be linearly added together to render realistic images 520 of the individual as they would appear in any image-based lighting environment, with complex light transport phenomena like subsurface scattering correctly represented. Synthetic portraits of each individual may be generated in many different lighting environments both with and without added directional light, rendering millions of pairs of images for image training data 405. The dataset can include model performance across diverse lighting environments and individuals.

Convolutional neural network 215 can be a fully-convolutional neural network as described herein. During training, convolutional neural network 215 can receive as inputs one or more input training images. Convolutional neural network 215 can include layers of nodes for processing input image 210. Example layers can include, but are not limited to, input layers, convolutional layers, activation layers, pooling layers, and output layers. Input layers can store input data, such as pixel data of input image 210 and inputs from other layers of convolutional neural network 215. Convolutional layers can compute an output of neurons connected to local regions in the input. In some examples, the predicted outputs can be fed back into the convolutional neural network 215 again as input to perform iterative refinement. Activation layers can determine whether or not an output of a preceding layer is "activated" or actually provided (e.g., provided to a succeeding layer). Pooling layers can downsample the input. For example, convolutional neural network 215 can involve one or more pooling layers downsample the input by a predetermined factor (e.g., a factor of two) in the horizontal and/or vertical dimensions. Output layers can provide an output of conventional neural network 215 to software and/or hardware interfacing with conventional neural network 215; e.g. to hardware and/or software used to display, print, communicate and/or otherwise provide surface orientation map 220 (e.g., to one or more components of relighting network 200). Layers 410, 412, 414, 416, 418, 420, 422, 424, 426, 428, 430, 432 can include one or more input layers, output layers, convolutional layers, activation layers, pooling layers, and/or other layers described herein.

In some implementations, convolutional neural network 215 can include encoding layers 410, 412, 414, 416, 418 arranged respectively as in an order as layers L1, L2, L3, L4, L5 each successively convolving its input and providing its output to a successive layer until reaching encoding layer L6 420. In FIG. 4, a depicted layer can include one or more actual layers. For example, encoding layer L1 410 can have one or more input layers, one or more activation layers, and/or one or more additional layers. As another example, encoding layer L2 412, encoding layer L3 414, encoding layer L4 416, encoding layer L5 418, and/or encoding layer L6 420 can include one or more convolutional layers, one or more activation layers (e.g., having a one-to-one relationship to the one or more convolutional layer), one or more pooling layers, and/or one or more additional layers.

In some examples, some or all of the pooling layers in convolutional neural network 215 can downsample an input by a common factor in both horizontal and vertical dimensions, while not downsampling depth dimensions associated with the input. The depth dimensions could store data for pixel colors (red, green, blue) and/or data representing scores. Other common factors for downsampling other than two can be used as well by one or more (pooling) layers of convolutional neural network 215.

Encoding layer L1 410 can receive and process input image 210 and provide an output to encoding layer L2 412. Encoding layer L2 412 can process the output of encoding layer L1 410 and provide an output to encoding layer L3 414. Encoding layer L3 414 can process the output of encoding layer L2 412 and provide an output to encoding layer L4 416. Encoding layer L4 416 can process the output of encoding layer L3 414 and provide an output to encoding layer L5 418. Encoding layer L5 418 can process the output of encoding layer L4 416 and provide an output to encoding layer L6 420.

Encoding layer L6 420 may provide the output to decoding layer L1 422 to begin predicting surface orientation map 220. Decoding layer L2 424 can receive and process inputs from both decoding layer L1 422 and encoding layer L5 418 (e.g., using a skip connection between encoding layer L5 418 and decoding layer L2 424) to provide an output to decoding layer L3 426. Decoding layer L3 426 can receive and process inputs from both decoding layer L2 424 and encoding layer L4 416 (e.g., using a skip connection between encoding layer L4 416 and decoding layer L3 426) to provide an output to decoding layer L4 428. Decoding layer L4 428 can receive and process inputs from both decoding layer L3 426 and encoding layer L3 414 (e.g., using a skip connection between encoding layer L3 414 and decoding layer L4 428) to provide an output to decoding layer L5 430. Decoding layer L5 430 can receive and process inputs from both decoding layer L4 428 and encoding layer L2 412 (e.g., using a skip connection between encoding layer L2 412 and decoding layer L5 430) to provide an output to decoding layer L6 432. Decoding layer L6 432 can receive and process inputs from both decoding layer L5 430 and encoding layer L1 410 (e.g., using a skip connection between encoding layer L1 410 and decoding layer L6 432) to provide a prediction of surface orientation map 220, which can then be output from decoding layer L6 432. The data provided by skip connections between encoding layers 418, 416, 414, 412, 410 and respective decoding layers 424, 426, 428, 430, 432 can be used by each respective decoding layer to provide additional details for generating a decoding layer's contribution to the prediction of surface orientation map 220. In some examples, each of decoding layers 422, 424, 426, 428, 430, 432 used to predict surface orientation map 220 can include one or more convolution layers, one or more activation layers, and perhaps one or more input and/or output layers. In some examples, some or all of layers 410, 412, 414, 416, 418, 420, 422, 424, 426, 428, 430, 432 can act as a convolutional encoder/decoder network.

In some implementations, convolutional neural network 215 is trained end to end with losses on the predicted surface orientation map 220. For example, a combination of L1 and adversarial losses can be used to train convolutional neural network 215. Generally, empirical data suggests that adversarial loss is a significant factor for good generalization to images in the wild when training data is limited (e.g., 15 subjects). However, L1 loss achieved similar results with a larger dataset (e.g., 70 subjects). Furthermore, adversarial loss can become harder to train with a larger variation in viewpoints and subject clothing. In some implementations, adversarial loss may be selectively applied to the face portion of an image. Other loss measures can be used as well or instead. For example, an L2 loss measure between surface orientation map predictions and training images can be minimized during training of convolutional neural network 215 for predicting surface orientation map 220.

As described herein, convolutional neural network 215 can include perceptual loss processing. For example, convolutional neural network 215 can use generative adversarial net (GAN) loss functions to determine if part or all of an image would be predicted to generate a surface orientation map, and so satisfy one or more perceptually-related conditions on lighting of that part of the image. In some examples, cycle loss can be used to feed predicted surface orientation maps back into convolutional neural network 215 to generate and/or refine further predicted surface orientation maps. In some examples, convolutional neural network 215 can utilize deep supervision techniques to provide constraints on intermediate layers. In some examples, convolutional neural network 215 can have more, fewer, and/or different layers to those shown in FIG. 4.

Light Direction—Automatic Light Placement

Figure 6:
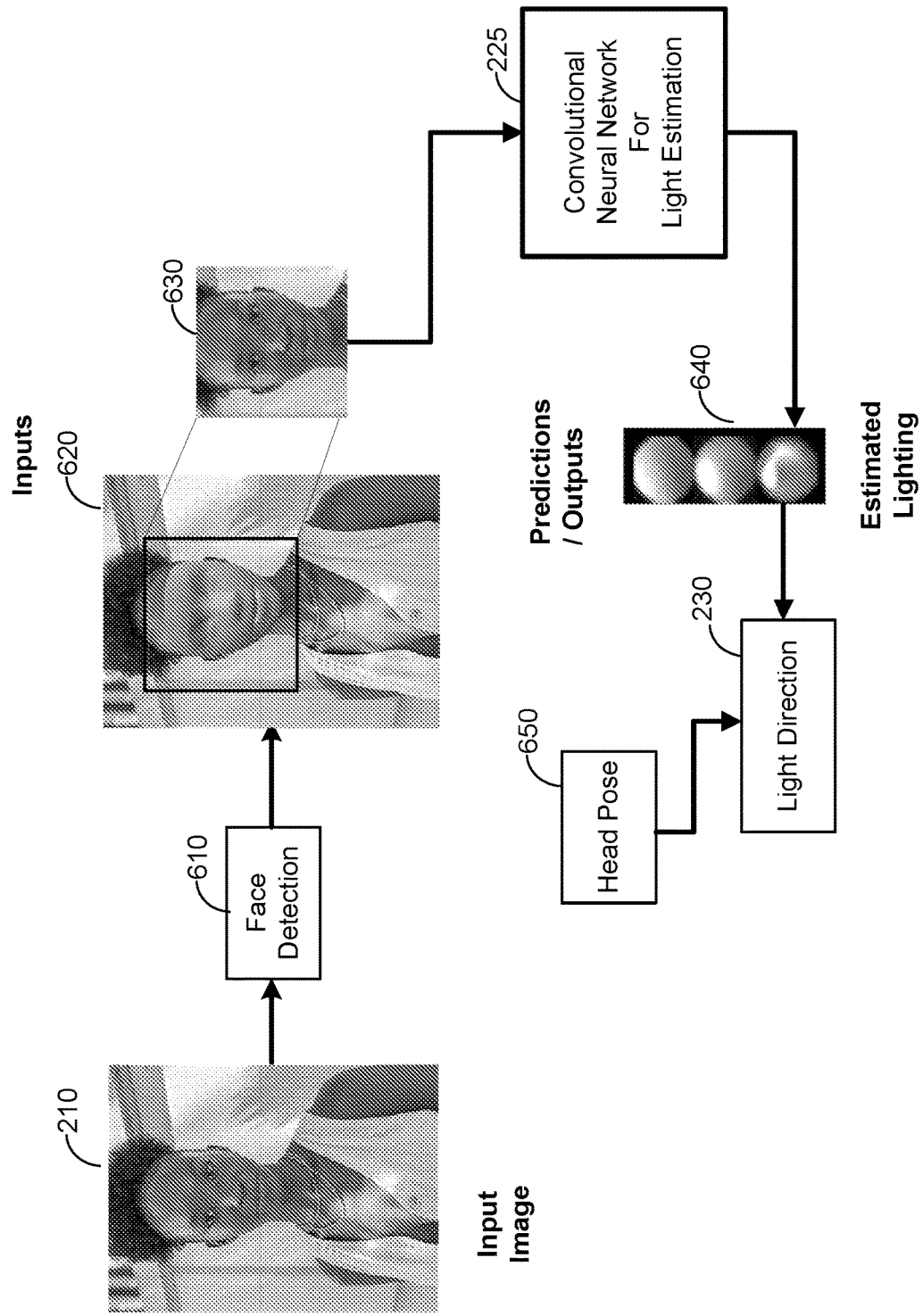
FIG. 6 illustrates an example method for recommending a light direction, in accordance with example embodiments.

FIG. 6 illustrates an example method for recommending a light direction, in accordance with example embodiments. Input image 210 can be processed by a face detection component 610 to detect a human face in input image 210. Image 620 illustrates the face of a human subject within a bounding box. This portion of image 620 can be cropped and resized (e.g., enlarged or shrunk) to obtain face 630. Although background imagery may provide contextual cues that aid in lighting estimation, some implementations compute a face bounding box for each input, and during training and inference some implementations crop each image, expanding the bounding box by 25%. During training some implementations add slight crop region variations, randomly changing their position and extent.

Face 630 and/or image 620 may be an input to convolutional neural network 225. In some embodiments, the architectural components of convolutional neural network 225 may be similar to those for convolutional neural network 215 described with respect to FIG. 4. Convolutional neural network 225 may take input face 630 and predict the environmental illumination profile for input image 210. Convolutional neural network 225 is a lighting estimation model that infers the direction, relative intensity, and color of all light sources in face 630 coming from all directions, considering face 630 as a light probe.

For example, an image of a person can be taken while being lighted by each individual light source in image 620 and/or face 630. In some aspects, training data for convolutional neural network 225 may include image training data 405 of FIG. 4. During training, convolutional neural network 225 can receive as inputs one or more input training images and input target lighting profiles. For example, convolutional neural network 225 can be trained on input image 410. During training, convolutional neural network 225 is being directed to generate predictions of original lighting profiles as estimated lighting 640.

Original lighting model is a light estimation model that predicts the actual lighting conditions used to illuminate input image 210. A lighting model can include a grid or other arrangement of lighting profile data related to lighting of part or all of one or more images. The lighting-profile data can include, but is not limited to, data representing one or more colors, intensities, directions, for the lighting of part or all of the one or more images. Convolutional neural network 225 can be configured to produce a predicted illumination profile or estimated lighting 640 based on the plurality of images of the plurality of human faces. The convolutional neural network 225 is configured to produce a predicted illumination profile or estimated lighting 640 based on input image 210. The input image 210 represents at least one human face. In some aspects, the convolutional neural network 225 includes a cost function (e.g., a discriminator and cost function data) that is based on a plurality of bidirectional reflectance distribution functions (BRDFs) corresponding to each of the reference objects. Estimated lighting 640 represents a spatial distribution of illumination incident on a subject of a portrait. An example representation of estimated lighting 640 includes coefficients of a spherical harmonic expansion of a lighting function of angle. Another example representation of estimated lighting 640 includes a grid of pixels, each having a value of the lighting function of solid angle.

As described herein, the input to the convolutional neural network 225 is an sRGB encoded LDR image, e.g., an LDR portrait 620, with the crop 630 of the face region of each image detected by face detector 610, resized to an input resolution of 256×256, and normalized to the range of [−0.5,0.5]. Convolutional neural network 225 has an encoder/decoder architecture including the with a latent vector representation of log-space HDR illumination of size 1024 at the bottleneck. In some implementations, the encoder and the decoder are implemented as convolutional neural networks. In some implementations, the encoder includes five 3×3 convolutions each followed by a blur-pooling operation, with successive filter depths of 16, 32, 64, 128, and 256, followed by one last convolution with a filter size of 8×8 and depth 256, and finally a fully-connected layer. The decoder includes three sets of 3×3 convolutions of filter depths 64, 32, and 16, each followed by a bilinear upsampling operation. The final output of the convolutional neural network 225 includes a 32×32 HDR image of estimated lighting 640, which can be visualized by rendering three different spheres (diffuse, matte silver, and mirror), and representing log-space omnidirectional illumination.

Figure 7:
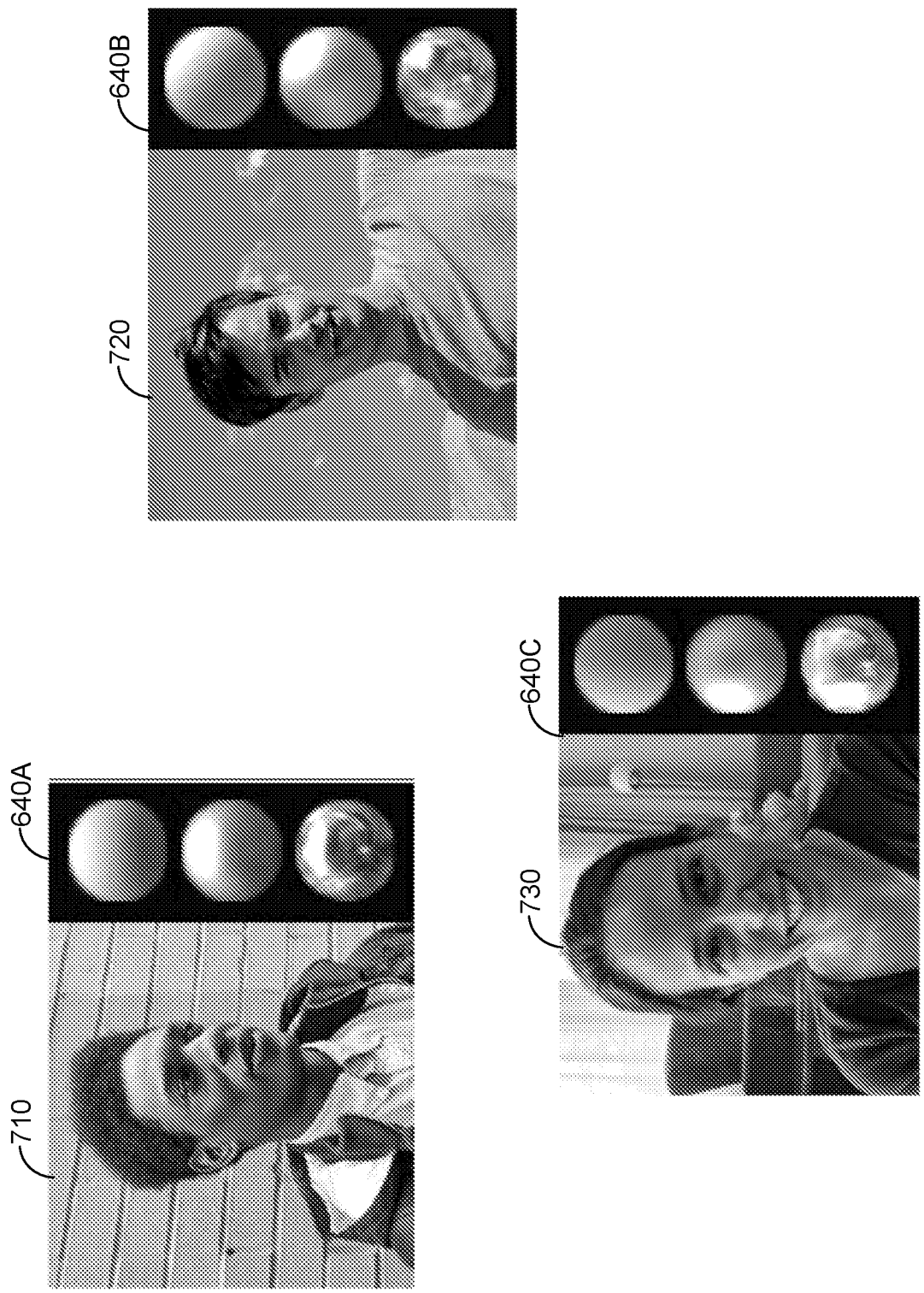
FIG. 7 illustrates example images with estimated lighting, in accordance with example embodiments.

FIG. 7 illustrates example images with estimated lighting, in accordance with example embodiments. For example, images 710, 720 and 730 are shown with respective estimated lighting 640A, 640B and 640C. For example, estimated lighting 640A, 640B and 640C estimate the high dynamic range, omnidirectional illumination profile from image 710, 720 and 730 respectively. The three spheres (640A, 640B and 640C) at the right of each image are rendered using the estimated illumination, showing the color, intensity, and directionality of the environmental lighting in images 710, 720 and 730 respectively.

Referring back to FIG. 6, input image 210 can be processed to estimate pose 650 for a human in input image 210. In some embodiments, this operation may be performed by a face geometry solution, such as a face mesh. A machine learning model can infer the 3D surface geometry with only a single camera input without a dedicated depth sensor. Face geometry data can consist of common 3D geometry primitives, including a face pose transformation matrix and a triangular face mesh. Also, for example, a machine learning solution for high-fidelity upper-body pose tracking, inferring 25 2D upper-body landmarks from RGB video frames, can be configured. Using a detector, an estimated pose detector first locates the pose region-of-interest (ROI) within an image frame. The detector subsequently predicts the pose landmarks within the ROI using the ROI-cropped frame as input.

Photographers often rely on perceptual cues when deciding how to augment environmental illumination with off-camera light sources. They assess the intensity and directionality of the light falling on the face, and also adjust their subject's head pose to complement it. The computational equivalents of these operations are estimated lighting 640 and estimated pose 650. Also, for example, in studio portrait photography, the main off-camera light source, or "key-light" is typically placed about 30° above the eye-line of a subject, and between 30° and 60° off the camera axis when looking overhead at the subject. These guidelines can be configured to be performed computationally based on estimated lighting 640 and estimated pose 650 to automatically suggest an optimal light direction 230. For example, light direction 230 indicates a direction from which synthetic lighting may be added to input image 210, similar to how a professional photographer can place an off-camera light source to illuminate a subject. Thus, pre-existing lighting directionality in the scene can be enhanced while targeting a balanced, subtle key-to-fill lighting ratio of about 2:1. As used herein, fill lighting generally refers to additional lighting that may be added to illuminate low frequency portions of an image.

Given a desired lighting direction 230 and input image 210, a machine learning model can be trained to add the synthetic illumination from a directional light source to an original photograph. To supervise training, millions of pairs of portraits both with and without the extra light are used. Photographing such a dataset in real life would be challenging, requiring near-perfect registration of portraits captured across different lighting conditions. Instead, many individuals with different face shapes, genders, skin tones, hairstyles, and clothing/accessories can be photographed in a computational illumination system.

Surface Orientation Map*Optimal Light Direction=Light Visibility Map

Figure 8:
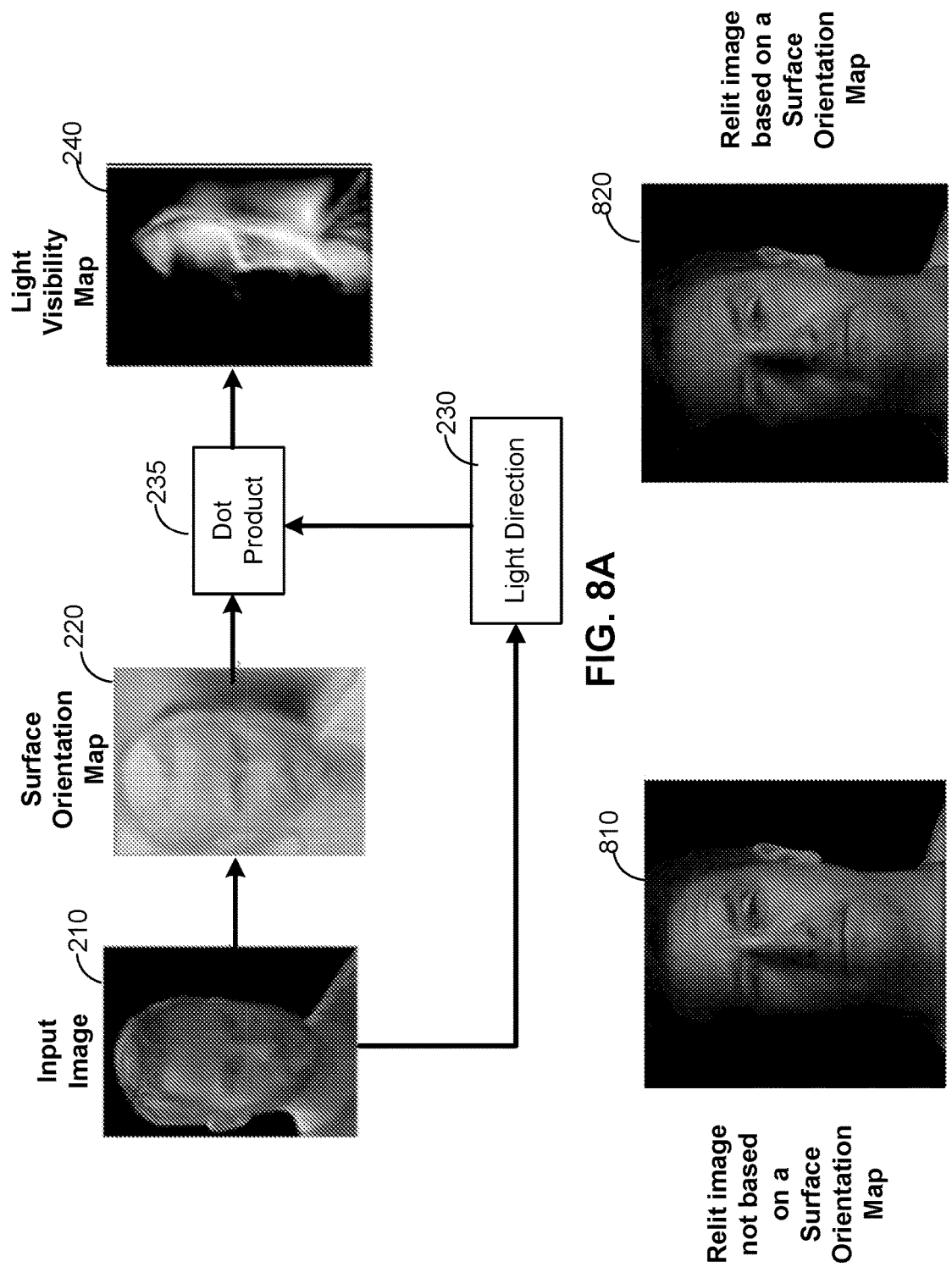
FIG. 8A illustrates an example network architecture to determine a light visibility map, in accordance with example embodiments.
FIG. 8B illustrates an example image highlighting an effect of surface geometry in photo illumination, in accordance with example embodiments.

FIG. 8A illustrates an example network architecture to determine a light visibility map, in accordance with example embodiments. Input image 210 can be processed to output surface orientation map 220 and light direction 230. As per Lambert's law, an object composed of a relatively matte material reflects an amount of light proportional to the cosine of the angle between its surface orientation (e.g., surface orientation map 220) and the direction of the incident light (e.g., light direction 230). Accordingly, Lambert's law can be applied to take the dot product 235 to obtain light visibility map 240.

Light visibility map 240 is a representation of light direction 230 customized to surface geometry. Such a representation can serve two purposes. First, light direction 230 is more closely tied to a prediction of surface geometry, which may greatly simplify the image quality assessment of relighting network 200. Many errors made in relighting can be traced back to errors in the predicted surface orientation map 220. Second, light visibility map 240 serves as a better per-pixel representation of light direction 230 for the quotient image prediction UNet, such as third convolution network 245 of FIG. 2. Relighting network 200 need not infer which pixels are to be brightened, and only has to determine how they are brightened (e.g., material properties), and how subtle shadows may be cast (e.g., occlusions).

FIG. 8B illustrates an example image highlighting an effect of surface geometry in photo illumination, in accordance with example embodiments. For example, image 810 is obtained in a lighting network where a surface orientation map 220 is not used, and image 820 is obtained in a lighting network where a surface orientation map 220 is used. As illustrated, the geometry of the face in image 820 is more detailed and there is less flattening in the lower left half of the face, from the nose to the chin.

Quotient Image—Learning Detail-Preserving Relighting

Figure 9:
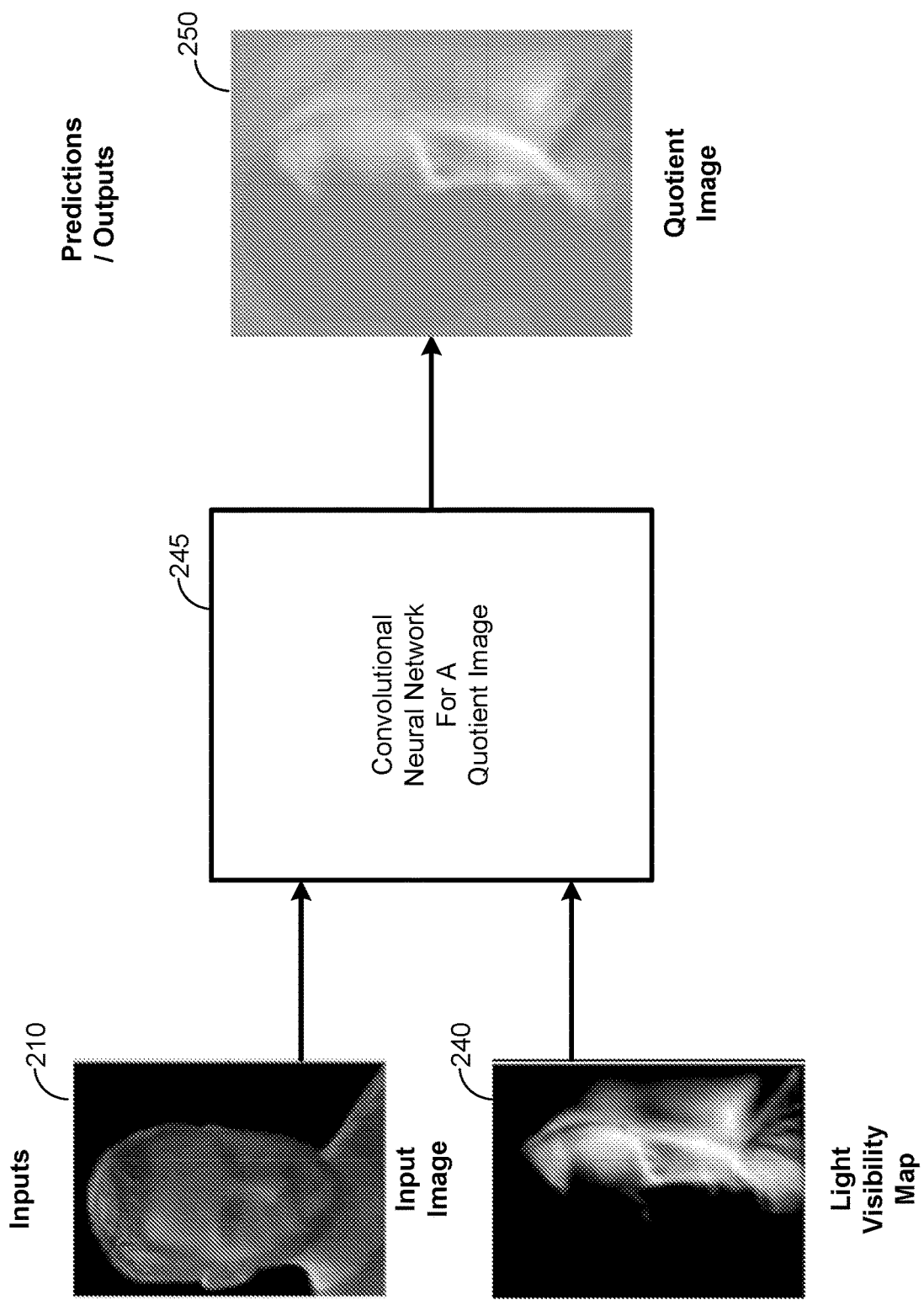
FIG. 9 is a diagram depicting an example network to predict a quotient image, in accordance with example embodiments.

FIG. 9 is a diagram depicting an example network to predict a quotient image, in accordance with example embodiments. For example, a convolutional neural network 245 may take input image 210, and light visibility map 240 to predict a quotient image 250 indicative of a per pixel light energy needed to enhance input image 210. Generally, quotient image 250 is a quotient of relit image 260 over input image 210. Predicting such a multiplicative factor enables relighting network 200 to preserve high frequency details like skin pores and individual hair strands in input image 210, rather than attempting to reproduce these high frequency details through a neural network. The predicted quotient image 250 is of significantly lower resolution than the input image 210. In order to apply a lower resolution quotient image 250 to a higher resolution input image 210, the predicted quotient image 250 can be upsampled using bilinear or other upsampling methods.

Figure 10:
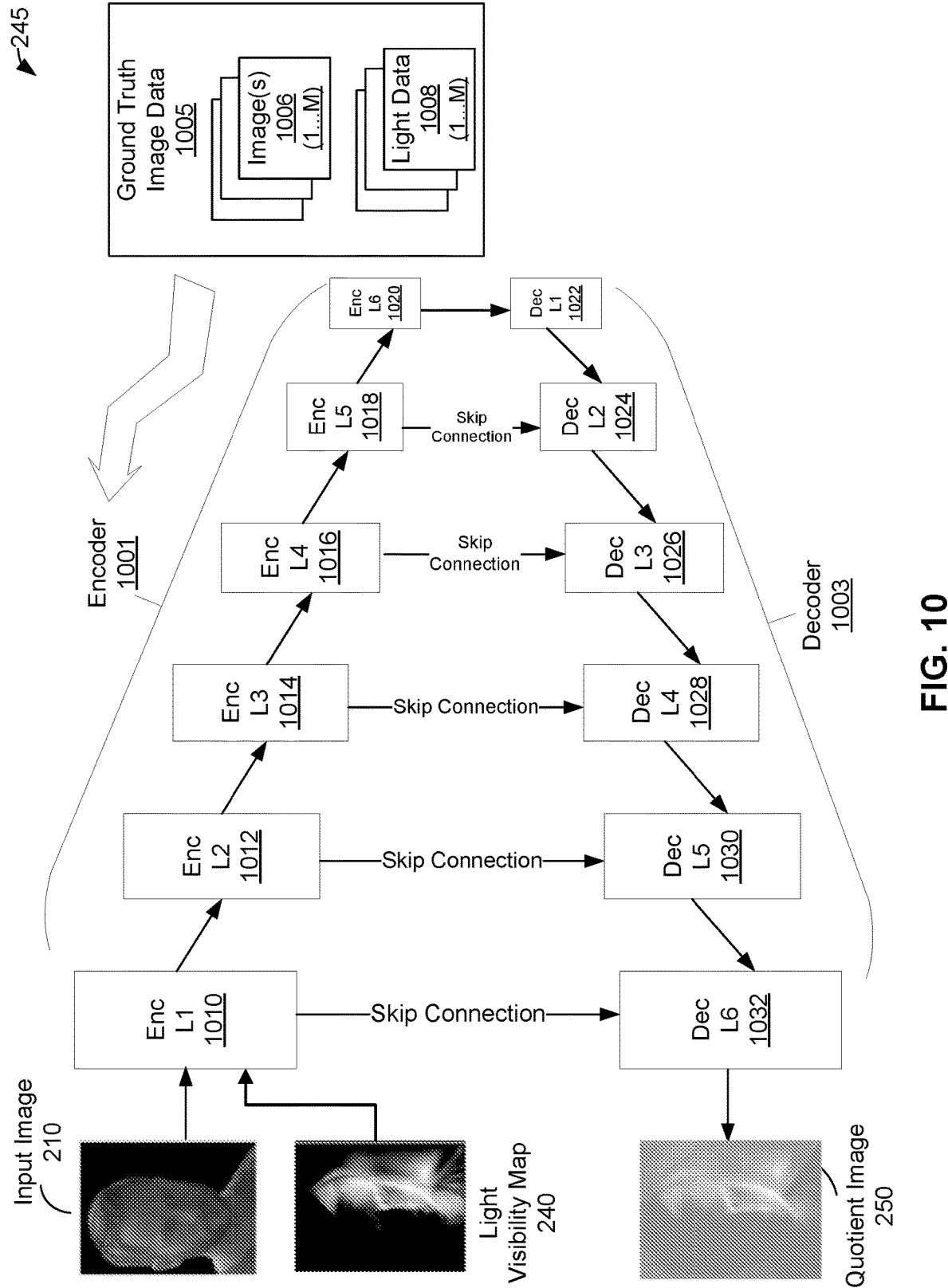
FIG. 10 is an example architecture for a neural network to predict a quotient image, in accordance with example embodiments.

FIG. 10 is an example architecture for a neural network to predict a quotient image, in accordance with example embodiments. For example, convolutional neural network 245 can be modeled around a UNet with skip connections. In some embodiments, the input image 210 and light visibility map 240 can go through 6 encoder blocks, Enc L1 1010, Enc L2 1012, Enc L3 1014, Enc L4 1016, Enc L5 1018, and Enc L6 1020, and 6 decoder blocks, Dec L1 1022, Dec L2 1024, Dec L3 1026, Dec L4 1028, Dec L5 1030, and Dec L6 1032. Each encoder block of encoder 1001 consists of a single convolution followed by downsampling by a factor of 2 followed by a blur-pooling operation. Each decoder block of decoder 1003 consists of a single convolution followed by upsampling by a factor of 2 followed by a bilinear upsampling operation. Skip connections from the encoder 1001 are concatenated or added to the upsampled features of decoder 1003 depending on the network version. In some example embodiments, filters for encoder 1001 may include (16, 32, 64, 128, 256, 256) filters for the encoder blocks yielding a final bottleneck size of (4×3×256). Similarly, filters for decoder 1003 may include (256, 256, 128, 64, 32, 16) features to return back to the (256×192) image resolution. A final convolution with 3 filters can be used to produce quotient image 250 from the decoder output. Relu activations can be used after all convolutions. This may be further supervised with the ground truth image data 1005.

Convolutional neural network 245 can be a fully-convolutional neural network as described herein. During training, convolutional neural network 245 can receive as inputs one or more input training images 1006 (1 ... M) and light data 1008 (1 ... M) from ground truth image data 1005. Convolutional neural network 245 can include layers of nodes for processing input image 210 and light visibility map 240. Example layers can include, but are not limited to, input layers, convolutional layers, activation layers, pooling layers, and output layers. Input layers can store input data, such as pixel data of input image 210 and light visibility map 240, and inputs from other layers of convolutional neural network 245. Convolutional layers can compute an output of neurons connected to local regions in the input. In some cases, a bilinear upsampling followed by a convolution is performed to apply a filter to a relatively small input to expand/upsample the relatively small input to become a larger output. Activation layers can determine whether or not an output of a preceding layer is "activated" or actually provided (e.g., provided to a succeeding layer). Pooling layers can downsample the input. For example, convolutional neural network 245 can use one or more pooling layers to downsample the input by a predetermined factor (e.g., a factor of two) in the horizontal and/or vertical dimensions. Output layers can provide an output of conventional neural network 245 to software and/or hardware interfacing with conventional neural network 245; e.g. to hardware and/or software used to display, print, communicate and/or otherwise provide quotient image 250 (e.g., to one or more components of relighting network 200). Layers 1010, 1012, 1014, 1016, 1018, 1020, 1022, 1024, 1026, 1028, 1030, 1032 can include one or more input layers, output layers, convolutional layers, activation layers, pooling layers, and/or other layers described herein.

In some implementations, convolutional neural network 245 can include encoding layers 1010, 1012, 1014, 1016, 1018 arranged respectively as in an order as layers L1, L2, L3, L4, L5 each successively convolving its input and providing its output to a successive layer until reaching encoding layer L6 1020. In FIG. 10, a depicted layer can include one or more actual layers. For example, encoding layer L1 1010 can have one or more input layers, one or more activation layers, and/or one or more additional layers. As another example, encoding layer L2 1012, encoding layer L3 1014, encoding layer L4 1016, encoding layer L5 1018, and/or encoding layer L6 1020 can include one or more convolutional layers, one or more activation layers (e.g., having a one-to-one relationship to the one or more convolutional layer), one or more pooling layers, and/or one or more additional layers.

In some examples, some or all of the pooling layers in convolutional neural network 245 can downsample an input by a common factor in both horizontal and vertical dimensions, while not downsampling depth dimensions associated with the input. The depth dimensions could store data for pixel colors (red, green, blue) and/or data representing scores. Other common factors for downsampling other than two can be used as well by one or more (pooling) layers of convolutional neural network 245.

Encoding layer L1 1010 can receive and process input image 210 and light visibility map 240 and provide an output to encoding layer L2 1012. Encoding layer L2 1012 can process the output of encoding layer L1 1010 and provide an output to encoding layer L3 1014. Encoding layer L3 1014 can process the output of encoding layer L2 1012 and provide an output to encoding layer L4 1016. Encoding layer L4 1016 can process the output of encoding layer L3 1014 and provide an output to encoding layer L5 1018. Encoding layer L5 1018 can process the output of encoding layer L4 1016 and provide an output to encoding layer L6 1020.

Encoding layer L6 1020 may provide the output to decoding layer L1 1022 to begin predicting quotient image 250. Decoding layer L2 1024 can receive and process inputs from both decoding layer L1 1022 and encoding layer L5 1018 (e.g., using a skip connection between encoding layer L5 1018 and decoding layer L2 1024) to provide an output to decoding layer L3 1026. Decoding layer L3 1026 can receive and process inputs from both decoding layer L2 1024 and encoding layer L4 1016 (e.g., using a skip connection between encoding layer L4 1016 and decoding layer L3 1026) to provide an output to decoding layer L4 1028. Decoding layer L4 1028 can receive and process inputs from both decoding layer L3 1026 and encoding layer L3 1014 (e.g., using a skip connection between encoding layer L3 1014 and decoding layer L4 1028) to provide an output to decoding layer L5 1030. Decoding layer L5 1030 can receive and process inputs from both decoding layer L4 1028 and encoding layer L2 1012 (e.g., using a skip connection between encoding layer L2 1012 and decoding layer L5 1030) to provide an output to decoding layer L6 1032.

Decoding layer L6 1032 can receive and process inputs from both decoding layer L5 1030 and encoding layer L1 1010 (e.g., using a skip connection between encoding layer L1 1010 and decoding layer L6 1032) to provide a prediction of quotient image 250, which can then be output from decoding layer L6 1032. The data provided by skip connections between encoding layers 1018, 1016, 1014, 1012, 1010 and respective decoding layers 1024, 1026, 1028, 1030, 1032 can be used by each respective decoding layer to provide additional details for generating a decoding layer's contribution to the prediction of quotient image 250. In some examples, each of decoding layers 1022, 1024, 1026, 1028, 1030, 1032 used to predict quotient image 250 can include one or more convolution layers, one or more activation layers, and perhaps one or more input and/or output layers. In some examples, some or all of layers 1010, 1012, 1014, 1016, 1018, 1020, 1022, 1024, 1026, 1028, 1030, 1032 can act as a convolutional encoder/decoder network.

In some implementations, convolutional neural network 245 can be trained end to end with losses on the high resolution relit image 260. For example, a loss can be computed as Loss (UpsampledQuotient*HighResInputImage, HighResGroundTruthImage), where UnsampledQuotient is an unsampled quotient image, HighResInputImage is the high resolution input image, and HighResGroundTruthImage is the high resolution ground truth image, to directly focus on the high resolution relit image 260, instead of attempting to obtain an exact quotient image 250. A combination of L1 and adversarial losses can be used to train convolutional neural network 245. Generally, empirical data suggests that adversarial loss is a significant factor for good generalization to images in the wild when training data is limited (e.g., 15 subjects). However, L1 loss achieved similar results with a larger dataset (e.g., 70 subjects). Furthermore, adversarial loss can become harder to train with a larger variation in viewpoints and subject clothing. In some implementations, adversarial loss may be selectively applied to the face portion of an image. Other loss measures can be used as well or instead. For example, an L2 loss measure between surface orientation map predictions and training images can be minimized during training of convolutional neural network 245 to obtain relit image 260.

As described herein, convolutional neural network 245 can include perceptual loss processing. For example, convolutional neural network 245 can use generative adversarial net (GAN) loss functions to determine if part or all of an image would be predicted to generate a surface orientation map, and so satisfy one or more perceptually-related conditions on lighting of that part of the image. In some examples, the predicted outputs can be fed back into the convolutional neural network 245 again as input to perform iterative refinement. In some examples, convolutional neural network 245 can utilize deep supervision techniques to provide constraints on intermediate layers. In some examples, convolutional neural network 245 can have more, fewer, and/or different layers to those shown in FIG. 10.

Figure 11:
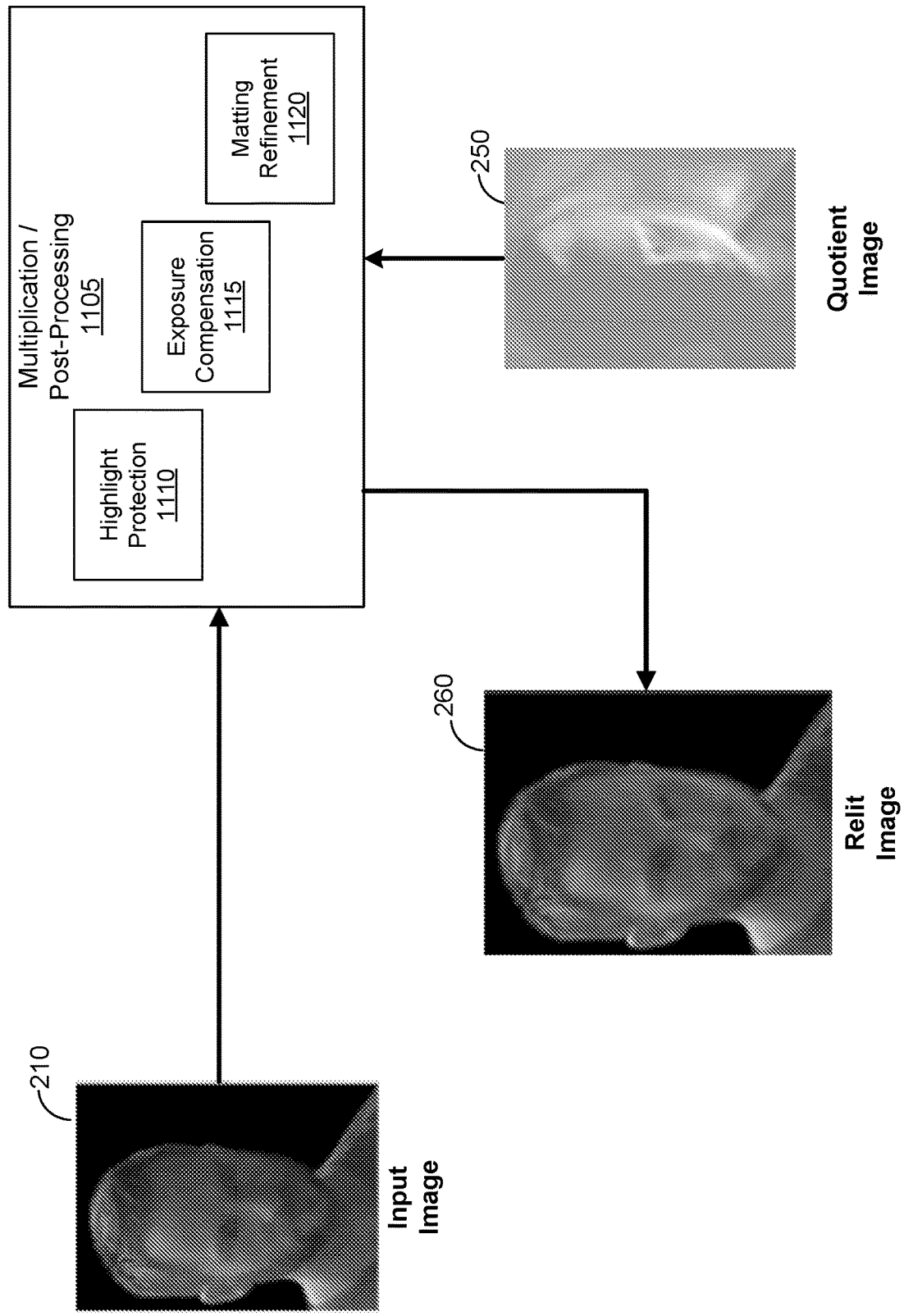
FIG. 11 is an example network illustrating post-processing techniques, in accordance with example embodiments.

FIG. 11 is an example network illustrating post-processing techniques, in accordance with example embodiments. In one aspect, a multiplication/post-processing operation 1105 can be applied to input image 210 and quotient image 250 to output relit image 260. As described herein, quotient image 250 is indicative of a per pixel multiplicative factor that makes each pixel darker, lighter, or unchanged. Values of quotient image 250 are real numbers that are not constrained. However, during post-processing 1105, an increase in average foreground brightness, or average foreground luma, can be bounded. Such an increase can be kept fixed during training, and during post-processing 1105, constraints may be added so that the relit image 260 is photorealistic. Accordingly, in some embodiments, quotient image 250 may be post-processed, thereby resulting in a more realistic rendition of relit image 260.

One or more post-processing techniques can be applied. For example, highlight protection 1110 can be applied to enhance input image 210. Brightly lit portions of the input image 210 can be subdued, thereby providing a more realistic rendition of input image 210 by restoring, for example, a natural skin color. Generally, highlight protection 1110 provides a local adjustment of brightness. Also, for example, exposure compensation 1115 can be applied. Assuming that input image 210 is captured with a fixed exposure, the input image 210 can be normalized to a fixed foreground exposure value. Generally, input images may have a wide range of exposure values. For example, exposure values can depend on light colored clothes, dark colored clothes, and so on. Thus, input image 210 may be compensated for under and/or over exposure, and exposure can be compensated to further adjust the quotient images. Generally, exposure compensation 1115 provides a global adjustment of brightness. As another example, a matting refinement 1120, can be applied to input image 210 to smooth out edges.

Figure 12:
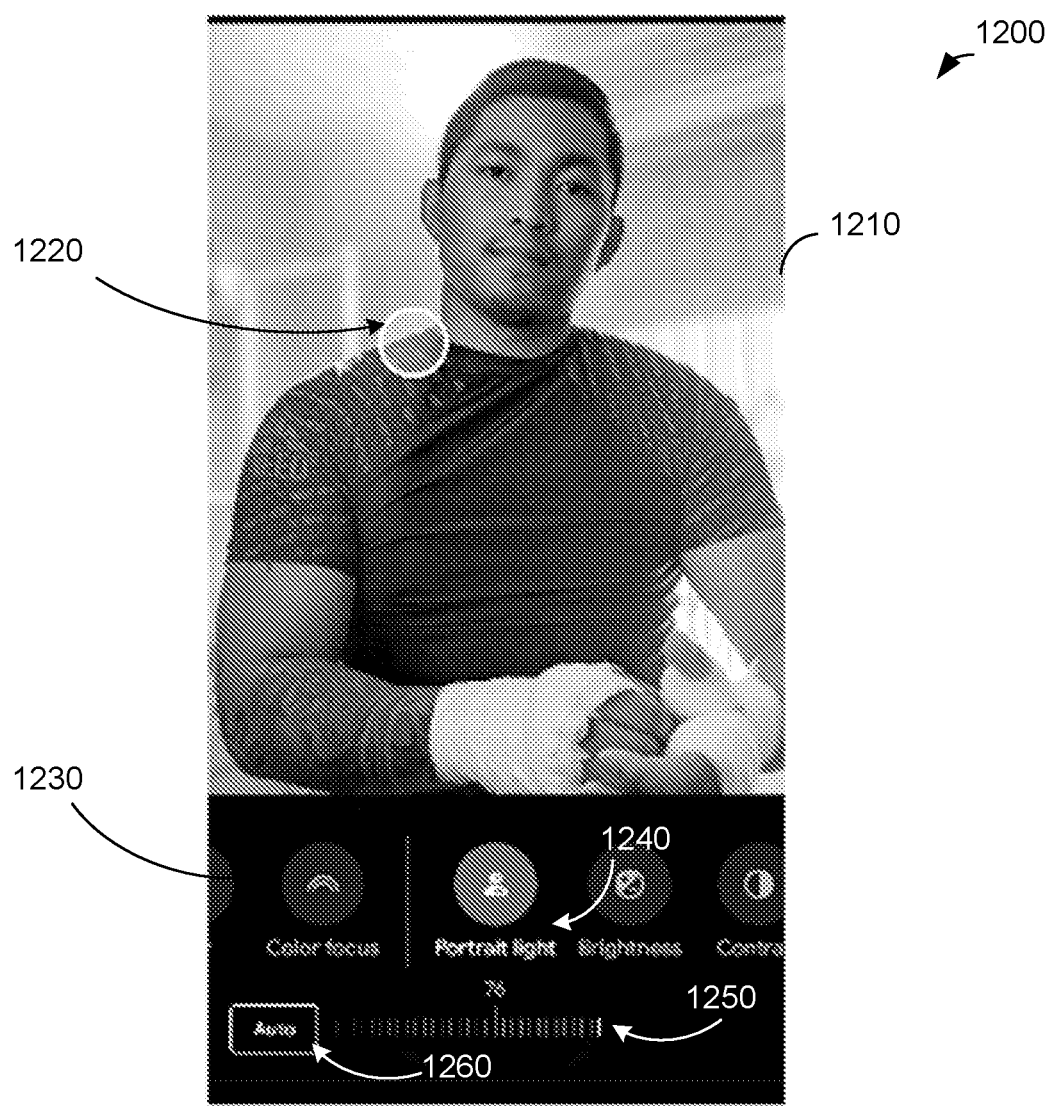
FIG. 12 is an example interactive graphical user interface, in accordance with example embodiments.

FIG. 12 is an example interactive graphical user interface (UI) 1200, in accordance with example embodiments. UI 1200 can be displayed via a computing device, such as a display screen 1210 of a mobile phone. A user can be provided with an ability to adjust a light position 1220 by changing input values via a user-friendly slider bar 1230. For example, a selectable option for "Portrait Light" 1240 can be selected by the user. This allows the user to reposition the light position 1220 to relight an image. The user can also change light intensity by using a user-friendly intensity scale 1250. As another example, an "Auto" setting 1260 can automatically reposition light position 1220 and light intensity for optimal effect. Adjusting the light position and light intensity changes the synthetic illumination, and an input image can be enhanced based on the one or more techniques described herein (e.g., with reference to relighting network 200).

Figure 13:
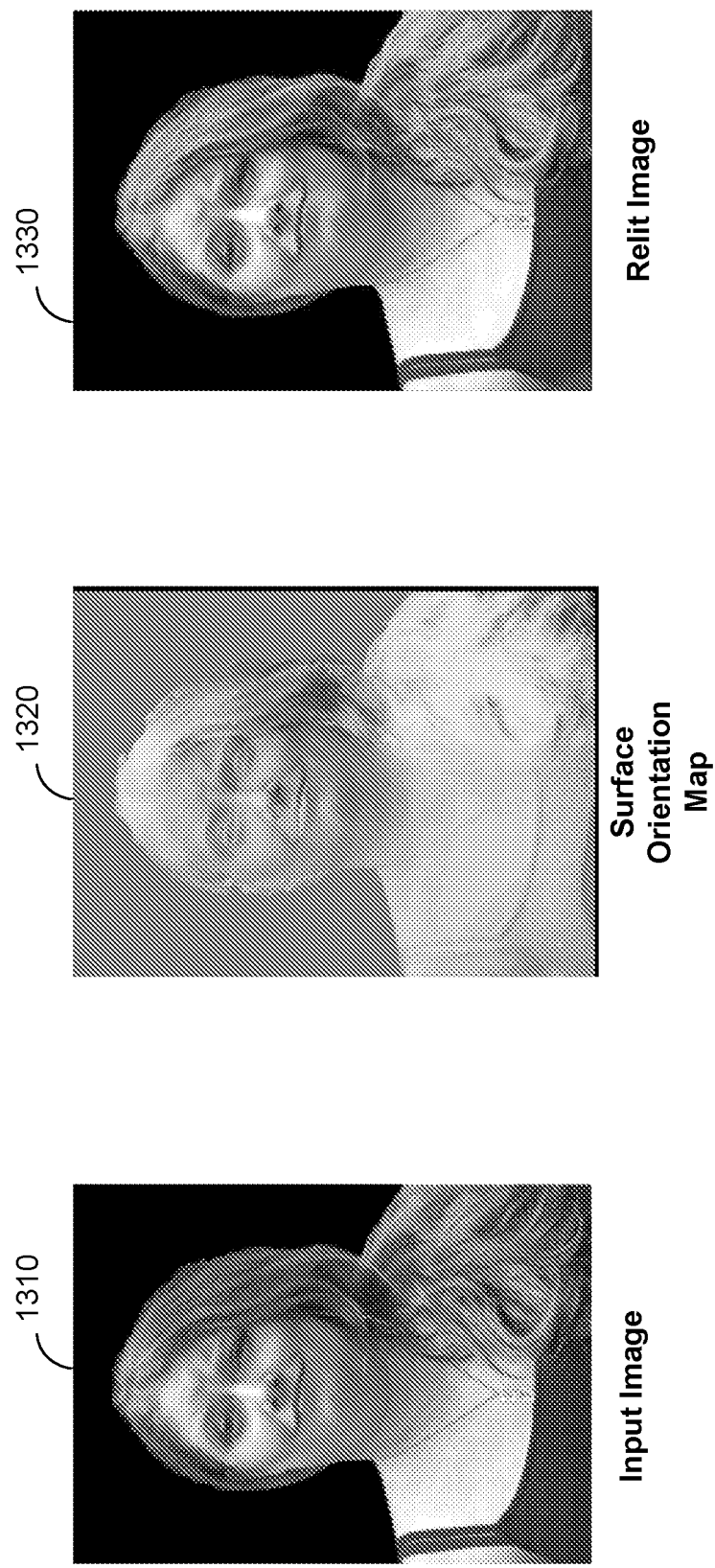
FIG. 13 illustrates an example input-output image pair based on a surface orientation map, in accordance with example embodiments.

FIG. 13 illustrates an example input-output image pair based on a surface orientation map, in accordance with example embodiments. For example, input image 1310 can be processed to obtain surface orientation map 1320. The surface orientation map 1320 can then be combined with a light direction to output relit image 1330.

Figure 14:
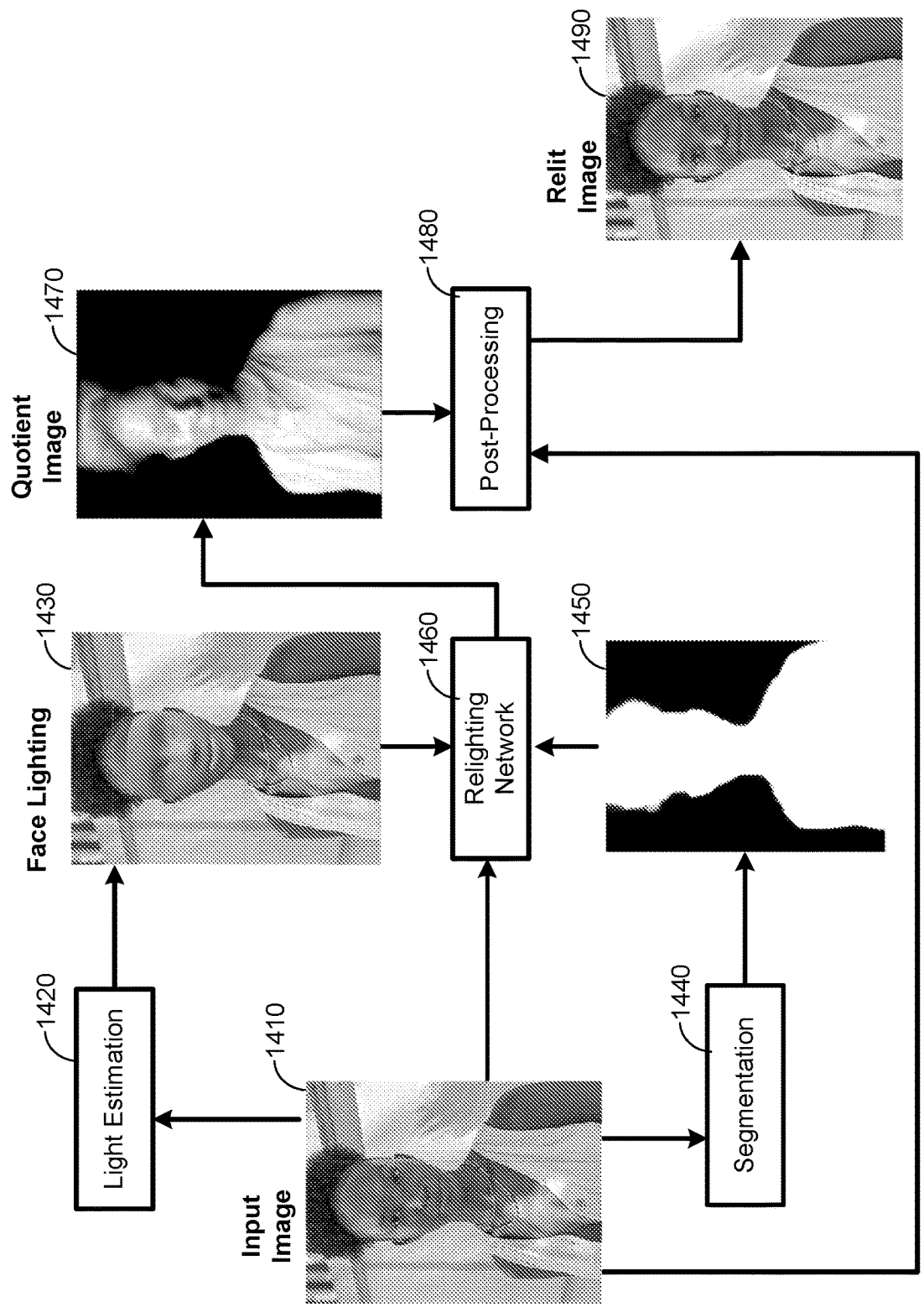
FIG. 14 illustrates an example relighting pipeline, in accordance with example embodiments.

FIG. 14 illustrates an example relighting pipeline, in accordance with example embodiments. Input image 1410 shows a portrait of a human. In some instances, input image 1410 can be an image that a user has captured with an image capturing device. In other instances, input image 1410 can be an image from a photo library of a user. A user may provide an instruction to enhance input image 1410. In response, input image 1410 is processed for light estimation 1420. For example, an original environmental lighting in input image 1410 can be predicted. In some implementations, a convolutional neural network (e.g., convolutional neural network 225) can be used for light estimation 1420. A face detection operation can be performed on input image 1420, and a face light estimation 1430 can be performed. In some instances, one or more aspects of the network architecture described with respect to FIG. 6 can be used for face light estimation 1430.

Figure 15:
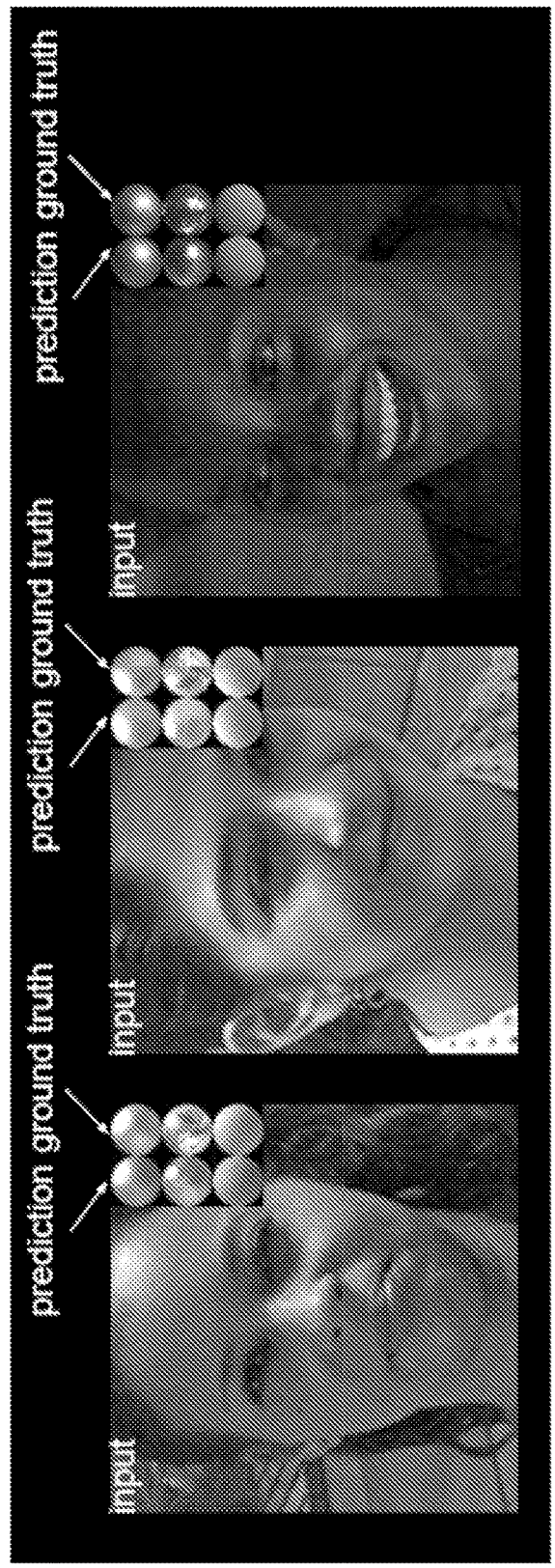
FIG. 15 illustrates example input images with predicted face light estimations, in accordance with example embodiments.

FIG. 15 illustrates example input images with predicted face light estimations, in accordance with example embodiments. A face light estimation 1530 can be performed on each input image. Each input image in FIG. 15 is shown with two sets of 3 spheres. The first set (to the left) corresponds to estimated face lighting, and the second set (to the right) corresponds to an environmental lighting or ground truth. The three spheres provide visual representations of color, intensity, and directionality of the environmental lighting or ground truth in each respective input image.

Referring to FIG. 14 again, segmentation 1440 can be performed on input image 1410. For example, a body part segmentation or an alpha mask segmentation can be performed to detect foreground object 1450. Input image 1410, predicted face lighting 1430, and foreground object 1450 can be input to relighting network 1460. One or more aspects of relighting network 1460 can correspond to aspects of relighting network 200. For example, a light direction for synthetic lighting can be automatically optimized. In some instances, aspects of this operation can be performed by a neural network (e.g., convolutional neural network 225). In some implementations, the light direction can be input as a user preference (e.g., via user interface 1200). Also, for example, a surface orientation map (e.g., surface orientation map 220) can be predicted. In some instances, aspects of this operation can be performed by a neural network (e.g., convolutional neural network 215). A scalar product of the surface orientation map and the light direction can be used to output a light visibility map (e.g., light visibility map 240). A quotient image 1470 can be output by relighting network 1460. In some instances, input image 1410 and quotient image 1470 can be multiplied to output relit image 1490. In some instances, post-processing 1480 can be performed on input image 1410 based on quotient image 1470 to output relit image 1490.

Training Machine Learning Models for Generating Inferences/Predictions

Figure 16:
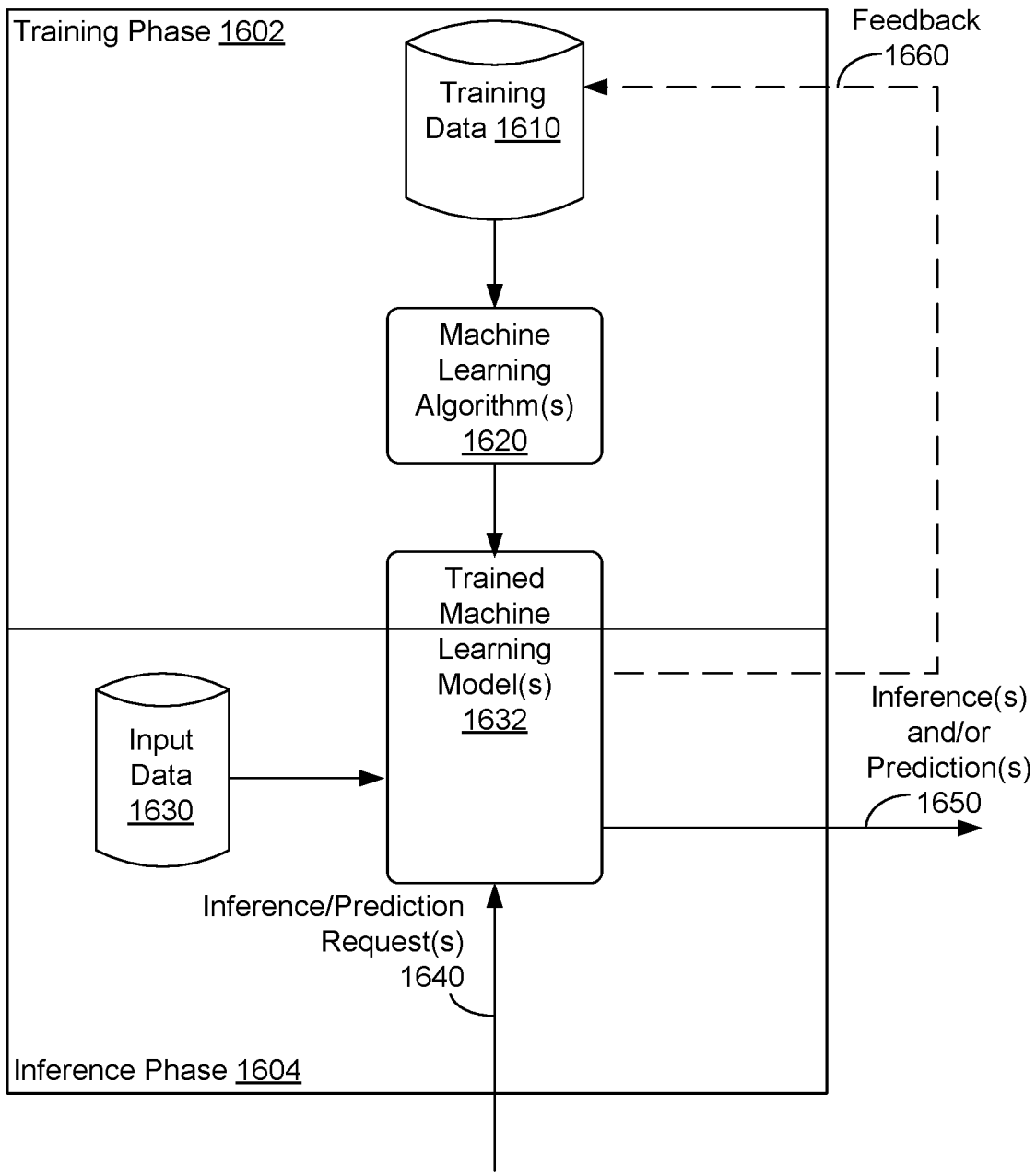
FIG. 16 is a diagram illustrating training and inference phases of a machine learning model, in accordance with example embodiments.

FIG. 16 shows diagram 1600 illustrating a training phase 1602 and an inference phase 1604 of trained machine learning model(s) 1632, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 16 shows training phase 1602 where one or more machine learning algorithms 1620 are being trained on training data 1610 to become trained machine learning model 1632. Then, during inference phase 1604, trained machine learning model 1632 can receive input data 1630 and one or more inference/prediction requests 1640 (perhaps as part of input data 1630) and responsively provide as an output one or more inferences and/or predictions 1650.

As such, trained machine learning model(s) 1632 can include one or more models of one or more machine learning algorithms 1620. Machine learning algorithm(s) 1620 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1620 may be supervised or unsupervised, and may implement any suitable combination of online and offline learning.

In some examples, machine learning algorithm(s) 1620 and/or trained machine learning model(s) 1632 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1620 and/or trained machine learning model(s) 1632. In some examples, trained machine learning model(s) 1632 can be trained, reside and execute to provide inferences on a particular computing device, and/or otherwise can make inferences for the particular computing device.

During training phase 1602, machine learning algorithm(s) 1620 can be trained by providing at least training data 1610 as training input using unsupervised, supervised, semi-supervised, and/or reinforcement learning techniques. Unsupervised learning involves providing a portion (or all) of training data 1610 to machine learning algorithm(s) 1620 and machine learning algorithm(s) 1620 determining one or more output inferences based on the provided portion (or all) of training data 1610. Supervised learning involves providing a portion of training data 1610 to machine learning algorithm(s) 1620, with machine learning algorithm(s) 1620 determining one or more output inferences based on the provided portion of training data 1610, and the output inference(s) are either accepted or corrected based on correct results associated with training data 1610. In some examples, supervised learning of machine learning algorithm(s) 1620 can be governed by a set of rules and/or a set of labels for the training input, and the set of rules and/or set of labels may be used to correct inferences of machine learning algorithm(s) 1620.

Semi-supervised learning involves having correct results for part, but not all, of training data 1610. During semi-supervised learning, supervised learning is used for a portion of training data 1610 having correct results, and unsupervised learning is used for a portion of training data 1610 not having correct results. Reinforcement learning involves machine learning algorithm(s) 1620 receiving a reward signal regarding a prior inference, where the reward signal can be a numerical value. During reinforcement learning, machine learning algorithm(s) 1620 can output an inference and receive a reward signal in response, where machine learning algorithm(s) 1620 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1620 and/or trained machine learning model(s) 1632 can be trained using other machine learning techniques, including but not limited to, incremental learning and curriculum learning.

In some examples, machine learning algorithm(s) 1620 and/or trained machine learning model(s) 1632 can use transfer learning techniques. For example, transfer learning techniques can involve trained machine learning model(s) 1632 being pre-trained on one set of data and additionally trained using training data 1610. More particularly, machine learning algorithm(s) 1620 can be pre-trained on data from one or more computing devices and a resulting trained machine learning model provided to a particular computing device, where the particular computing device is intended to execute the trained machine learning model during inference phase 1604. Then, during training phase 1602, the pre-trained machine learning model can be additionally trained using training data 1610, where training data 1610 can be derived from kernel and non-kernel data of the particular computing device. This further training of the machine learning algorithm(s) 1620 and/or the pre-trained machine learning model using training data 1610 of the particular computing device's data can be performed using either supervised or unsupervised learning. Once machine learning algorithm(s) 1620 and/or the pre-trained machine learning model has been trained on at least training data 1610, training phase 1602 can be completed. The trained resulting machine learning model can be utilized as at least one of trained machine learning model(s) 1632.

In particular, once training phase 1602 has been completed, trained machine learning model(s) 1632 can be provided to a computing device, if not already on the computing device. Inference phase 1604 can begin after trained machine learning model(s) 1632 are provided to the particular computing device.

During inference phase 1604, trained machine learning model(s) 1632 can receive input data 1630 and generate and output one or more corresponding inferences and/or predictions 1650 about input data 1630. As such, input data 1630 can be used as an input to trained machine learning model(s) 1632 for providing corresponding inference(s) and/or prediction(s) 1650 to kernel components and non-kernel components. For example, trained machine learning model(s) 1632 can generate inference(s) and/or prediction(s) 1650 in response to one or more inference/prediction requests 1640. In some examples, trained machine learning model(s) 1632 can be executed by a portion of other software. For example, trained machine learning model(s) 1632 can be executed by an inference or prediction daemon to be readily available to provide inferences and/or predictions upon request. Input data 1630 can include data from the particular computing device executing trained machine learning model(s) 1632 and/or input data from one or more computing devices other than the particular computing device.

Input data 1630 can include a collection of images provided by one or more sources. The collection of images can include images of an object, such as a human face, where the images of the human face are taken under different lighting conditions, images of multiple objects, images resident on the particular computing device, and/or other images. Other types of input data are possible as well.

Inference(s) and/or prediction(s) 1650 can include output images, output lighting models, output surface orientation maps, output light estimations, output quotient images, numerical values, and/or other output data produced by trained machine learning model(s) 1632 operating on input data 1630 (and training data 1610). In some examples, trained machine learning model(s) 1632 can use output inference(s) and/or prediction(s) 1650 as input feedback 1660. Trained machine learning model(s) 1632 can also rely on past inferences as inputs for generating new inferences.

Convolutional neural networks 215, 225, 245 can be examples of machine learning algorithm(s) 1620. After training, the trained version of convolutional neural networks 215, 225, 245 can be examples of trained machine learning model(s) 1632. In this approach, an example of inference/prediction request(s) 1640 can be a request to predict a surface orientation map from an input image of an object and a corresponding example of inferences and/or prediction(s) 1650 can be an output surface orientation map. As another example, an example of inference/prediction request(s) 1640 can be a request to predict an environmental lighting from an input image of an object and a corresponding example of inferences and/or prediction(s) 1650 can be an output set of 3-D vectors that predicts application of a particular lighting direction to the input image. Also, for example, an example of inference/prediction request(s) 1640 can be a request to determine a quotient image for an input image of an object and a corresponding example of inferences and/or prediction(s) 1650 can be an output image that predicts the quotient image as a per pixel multiplicative factor to be applied to the input image.

In some examples, a single computing device ("CD_SOLO") can include the trained version of convolutional neural network 215, perhaps after training convolutional neural network 215. Then, computing device CD_SOLO can receive requests to predict surface orientation maps from corresponding input images, and use the trained version of convolutional neural network 215 to generate output images that predict the surface orientation maps. In some examples, one computing device CD_SOLO can include the trained version of convolutional neural network 225, perhaps after training convolutional neural network 225. Then, computing device CD_SOLO can receive requests to predict light directions from corresponding input images, and use the trained version of convolutional neural network 225 to generate output images that predict the light directions. In some examples, one computing device CD_SOLO can include the trained version of convolutional neural network 245, perhaps after training convolutional neural network 245. Then, computing device CD_SOLO can receive requests to predict quotient images from corresponding input images, and use the trained version of convolutional neural network 215 to generate output images that predict the quotient images.

In some examples, two or more computing devices, such as a first client device ("CD_CLI") and a server device ("CD_SRV") can be used to provide output images; e.g., a first computing device CD_CLI can generate and send requests to apply particular synthetic lighting to corresponding input images to a second computing device CD_SRV. Then, CD_SRV can use the trained versions of convolutional neural networks 215, 225, 245, perhaps after training convolutional neural networks 215, 225, 245, to generate output images that predict application of the particular synthetic lighting to the input images, and respond to the requests from CD_CLI for the output images. Then, upon reception of responses to the requests, CD_CLI can provide the requested output images (e.g., using a user interface and/or a display, a printed copy, an electronic communication, etc.).

Example Data Network

Figure 17:
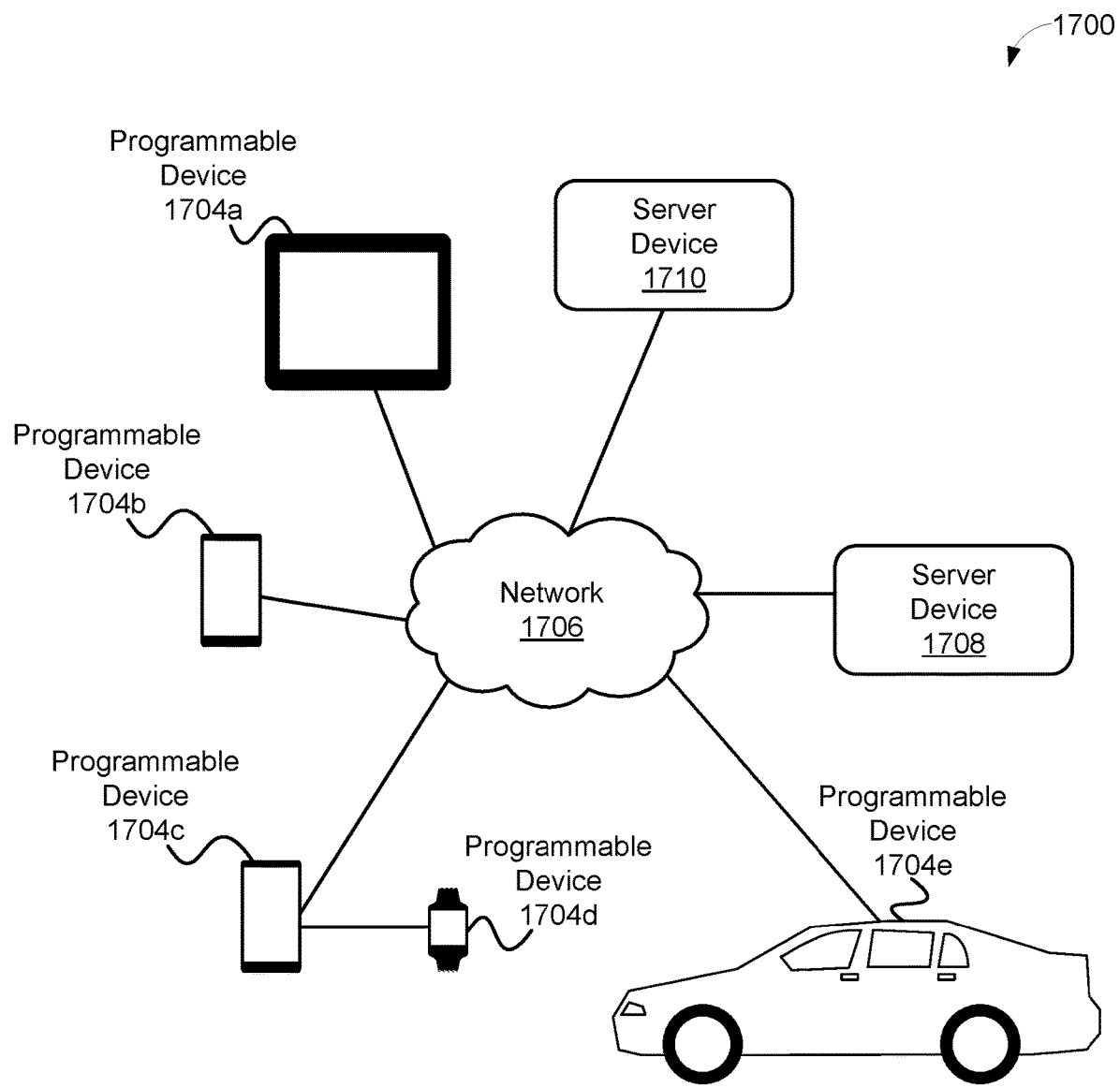
FIG. 17 depicts a distributed computing architecture, in accordance with example embodiments.

FIG. 17 depicts a distributed computing architecture 1700, in accordance with example embodiments. Distributed computing architecture 1700 includes server devices 1708, 1710 that are configured to communicate, via network 1706, with programmable devices 1704a, 1704b, 1704c, 1704d, 1704e. Network 1706 may correspond to a local area network (LAN), a wide area network (WAN), a WLAN, a WWAN, a corporate intranet, the public Internet, or any other type of network configured to provide a communications path between networked computing devices. Network 1706 may also correspond to a combination of one or more LANs, WANs, corporate intranets, and/or the public Internet.

Although FIG. 17 only shows five programmable devices, distributed application architectures may serve tens, hundreds, or thousands of programmable devices. Moreover, programmable devices 1704a, 1704b, 1704c, 1704d, 1704e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1704a, 1704b, 1704c, 1704e, programmable devices can be directly connected to network 1706. In other examples, such as illustrated by programmable device 1704d, programmable devices can be indirectly connected to network 1706 via an associated computing device, such as programmable device 1704c. In this example, programmable device 1704c can act as an associated computing device to pass electronic communications between programmable device 1704d and network 1706. In other examples, such as illustrated by programmable device 1704e, a computing device can be part of and/or inside a vehicle, such as a car, a truck, a bus, a boat or ship, an airplane, etc. In other examples not shown in FIG. 17, a programmable device can be both directly and indirectly connected to network 1706.

Server devices 1708, 1710 can be configured to perform one or more services, as requested by programmable devices 1704a-1704e. For example, server device 1708 and/or 1710 can provide content to programmable devices 1704a-1704e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1708 and/or 1710 can provide programmable devices 1704a-1704e with access to software for database, search, computation, graphical, audio, video, World Wide Web/Internet utilization, and/or other functions. Many other examples of server devices are possible as well.

Computing Device Architecture

Figure 18:
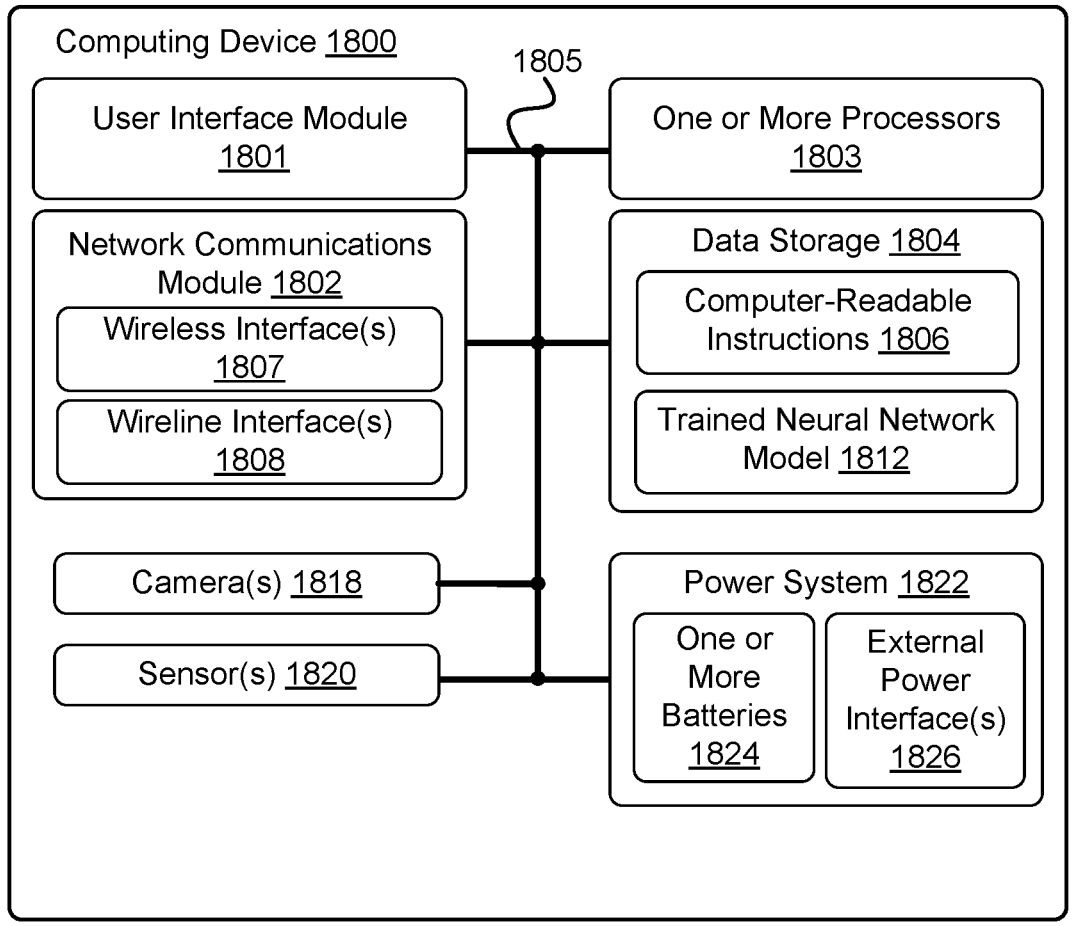
FIG. 18 is a block diagram of a computing device, in accordance with example embodiments.

FIG. 18 is a block diagram of an example computing device 1800, in accordance with example embodiments. In particular, computing device 1800 shown in FIG. 18 can be configured to perform at least one function of and/or related to a convolutional neural network, a predicted surface orientation map, a predicted original lighting model, a predicted quotient image, convolutional neural networks 215, 225, 245, and/or method 2000.

Computing device 1800 may include a user interface module 1801, a network communications module 1802, one or more processors 1803, data storage 1804, one or more cameras 1818, one or more sensors 1820, and power system 1822, all of which may be linked together via a system bus, network, or other connection mechanism 1805.

User interface module 1801 can be operable to send data to and/or receive data from external user input/output devices. For example, user interface module 1801 can be configured to send and/or receive data to and/or from user input devices such as a touch screen, a computer mouse, a keyboard, a keypad, a touch pad, a trackball, a joystick, a voice recognition module, and/or other similar devices. User interface module 1801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1801 can also be configured to generate audible outputs, with devices such as a speaker, speaker jack, audio output port, audio output device, earphones, and/or other similar devices. User interface module 1801 can further be configured with one or more haptic devices that can generate haptic outputs, such as vibrations and/or other outputs detectable by touch and/or physical contact with computing device 1800. In some examples, user interface module 1801 can be used to provide a graphical user interface (GUI) for utilizing computing device 1800, such as, for example, a graphical user interface illustrated in FIG. 15.

Network communications module 1802 can include one or more devices that provide one or more wireless interfaces 1807 and/or one or more wireline interfaces 1808 that are configurable to communicate via a network. Wireless interface(s) 1807 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1802 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1803 can include one or more general purpose processors, and/or one or more special purpose processors (e.g., digital signal processors, tensor processing units (TPUs), graphics processing units (GPUs), application specific integrated circuits, etc.). One or more processors 1803 can be configured to execute computer-readable instructions 1806 that are contained in data storage 1804 and/or other instructions as described herein.

Data storage 1804 can include one or more non-transitory computer-readable storage media that can be read and/or accessed by at least one of one or more processors 1803. The one or more computer-readable storage media can include volatile and/or non-volatile storage components, such as optical, magnetic, organic or other memory or disc storage, which can be integrated in whole or in part with at least one of one or more processors 1803. In some examples, data storage 1804 can be implemented using a single physical device (e.g., one optical, magnetic, organic or other memory or disc storage unit), while in other examples, data storage 1804 can be implemented using two or more physical devices.

Data storage 1804 can include computer-readable instructions 1806 and perhaps additional data. In some examples, data storage 1804 can include storage required to perform at least part of the herein-described methods, scenarios, and techniques and/or at least part of the functionality of the herein-described devices and networks. In some examples, data storage 1804 can include storage for a trained neural network model 1812 (e.g., a model of trained convolutional neural networks such as convolutional neural networks 215, 225, 245). In particular of these examples, computer-readable instructions 1806 can include instructions that, when executed by processor(s) 1803, enable computing device 1800 to provide for some or all of the functionality of trained neural network model 1812.

In some examples, computing device 1800 can include one or more cameras 1818. Camera(s) 1818 can include one or more image capture devices, such as still and/or video cameras, equipped to capture light and record the captured light in one or more images; that is, camera(s) 1818 can generate image(s) of captured light. The one or more images can be one or more still images and/or one or more images utilized in video imagery. Camera(s) 1818 can capture light and/or electromagnetic radiation emitted as visible light, infrared radiation, ultraviolet light, and/or as one or more other frequencies of light.

In some examples, computing device 1800 can include one or more sensors 1820. Sensors 1820 can be configured to measure conditions within computing device 1800 and/or conditions in an environment of computing device 1800 and provide data about these conditions. For example, sensors 1820 can include one or more of: (i) sensors for obtaining data about computing device 1800, such as, but not limited to, a thermometer for measuring a temperature of computing device 1800, a battery sensor for measuring power of one or more batteries of power system 1822, and/or other sensors measuring conditions of computing device 1800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1800, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1820 are possible as well.

Power system 1822 can include one or more batteries 1824 and/or one or more external power interfaces 1826 for providing electrical power to computing device 1800. Each battery of the one or more batteries 1824 can, when electrically coupled to the computing device 1800, act as a source of stored electrical power for computing device 1800. One or more batteries 1824 of power system 1822 can be configured to be portable. Some or all of one or more batteries 1824 can be readily removable from computing device 1800. In other examples, some or all of one or more batteries 1824 can be internal to computing device 1800, and so may not be readily removable from computing device 1800. Some or all of one or more batteries 1824 can be rechargeable. For example, a rechargeable battery can be recharged via a wired connection between the battery and another power supply, such as by one or more power supplies that are external to computing device 1800 and connected to computing device 1800 via the one or more external power interfaces. In other examples, some or all of one or more batteries 1824 can be non-rechargeable batteries.

One or more external power interfaces 1826 of power system 1822 can include one or more wired-power interfaces, such as a USB cable and/or a power cord, that enable wired electrical power connections to one or more power supplies that are external to computing device 1800. One or more external power interfaces 1826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1826, computing device 1800 can draw electrical power from the external power source the established electrical power connection. In some examples, power system 1822 can include related sensors, such as battery sensors associated with the one or more batteries or other types of electrical power sensors.

Cloud-Based Servers

Figure 19:
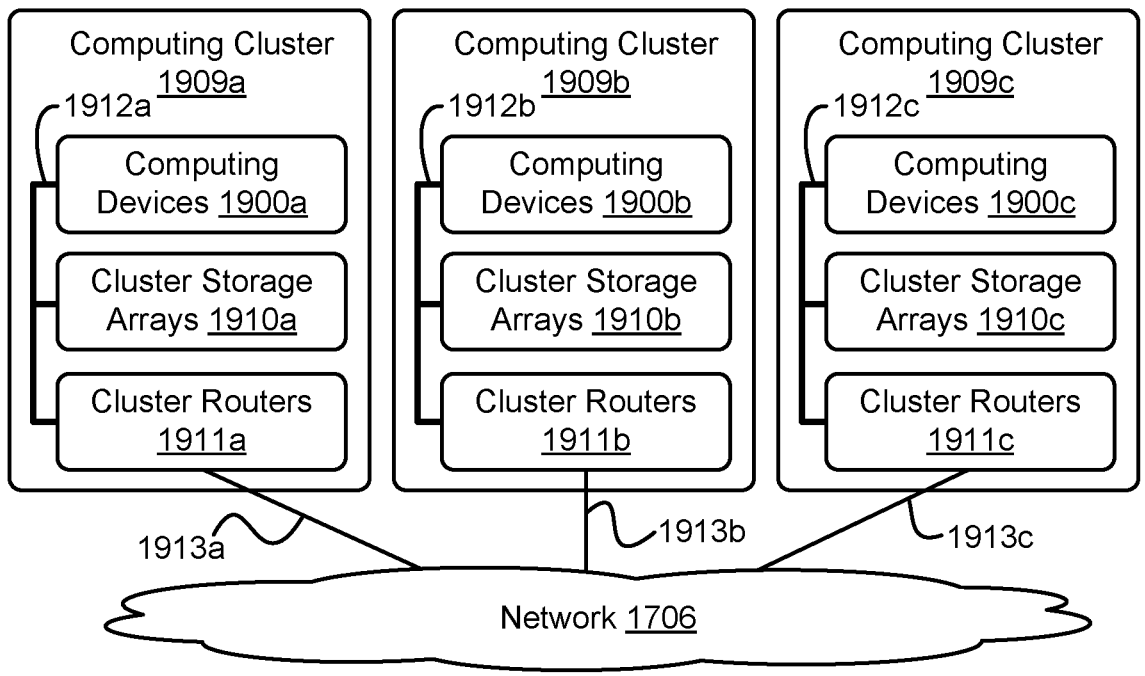
FIG. 19 depicts a network of computing clusters arranged as a cloud-based server system, in accordance with example embodiments.

FIG. 19 depicts a network 1706 of computing clusters 1909a, 1909b, 1909c arranged as a cloud-based server system in accordance with an example embodiment. Computing clusters 1909a, 1909b, 1909c can be cloud-based devices that store program logic and/or data of cloud-based applications and/or services; e.g., perform at least one function of and/or related to a convolutional neural networks, a predicted surface orientation map, a predicted light direction, a predicted quotient image, convolutional neural networks 215, 225, 245, and/or method 2400.

In some embodiments, computing clusters 1909a, 1909b, 1909c can be a single computing device residing in a single computing center. In other embodiments, computing clusters 1909a, 1909b, 1909c can include multiple computing devices in a single computing center, or even multiple computing devices located in multiple computing centers located in diverse geographic locations. For example, FIG. 19 depicts each of computing clusters 1909a, 1909b, and 1909c residing in different physical locations.

In some embodiments, data and services at computing clusters 1909a, 1909b, 1909c can be encoded as computer readable information stored in non-transitory, tangible computer readable media (or computer readable storage media) and accessible by other computing devices. In some embodiments, computing clusters 1909a, 1909b, 1909c can be stored on a single disk drive or other tangible storage media, or can be implemented on multiple disk drives or other tangible storage media located at one or more diverse geographic locations.

FIG. 19 depicts a cloud-based server system in accordance with an example embodiment. In FIG. 19, functionality of convolutional neural networks 215, 225, 245, and/or a computing device can be distributed among computing clusters 1909a, 1909b, 1909c. Computing cluster 1909a can include one or more computing devices 1900a, cluster storage arrays 1910a, and cluster routers 1911a connected by a local cluster network 1912*a*. Similarly, computing cluster 1909*b* can include one or more computing devices 1900*b*, cluster storage arrays 1910*b*, and cluster routers 1911*b* connected by a local cluster network 1912*b*. Likewise, computing cluster 1909*c* can include one or more computing devices 1900*c*, cluster storage arrays 1910*c*, and cluster routers 1911*c* connected by a local cluster network 1912*c*.

In some embodiments, each of computing clusters 1909*a*, 1909*b*, and 1909*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1909*a*, for example, computing devices 1900*a* can be configured to perform various computing tasks of convolutional neural network, confidence learning, and/or a computing device. In one embodiment, the various functionalities of a convolutional neural network, confidence learning, and/or a computing device can be distributed among one or more of computing devices 1900*a*, 1900*b*, 1900*c*. Computing devices 1900*b* and 1900*c* in respective computing clusters 1909*b* and 1909*c* can be configured similarly to computing devices 1900*a* in computing cluster 1909*a*. On the other hand, in some embodiments, computing devices 1900*a*, 1900*b*, and 1900*c* can be configured to perform different functions.

In some embodiments, computing tasks and stored data associated with a convolutional neural networks, and/or a computing device can be distributed across computing devices 1900*a*, 1900*b*, and 1900*c* based at least in part on the processing requirements of a convolutional neural networks, and/or a computing device, the processing capabilities of computing devices 1900*a*, 1900*b*, 1900*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1910*a*, 1910*b*, 1910*c* of computing clusters 1909*a*, 1909*b*, 1909*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of convolutional neural networks, and/or a computing device can be distributed across computing devices 1900*a*, 1900*b*, 1900*c* of computing clusters 1909*a*, 1909*b*, 1909*c*, various active portions and/or backup portions of these components can be distributed across cluster storage arrays 1910*a*, 1910*b*, 1910*c*. For example, some cluster storage arrays can be configured to store one portion of the data of a convolutional neural network, and/or a computing device, while other cluster storage arrays can store other portion(s) of data of a convolutional neural network, and/or a computing device. Also, for example, some cluster storage arrays can be configured to store the data of a first convolutional neural network, while other cluster storage arrays can store the data of a second and/or third convolutional neural network. Additionally, some cluster storage arrays can be configured to store backup versions of data stored in other cluster storage arrays.

Cluster routers 1911*a*, 1911*b*, 1911*c* in computing clusters 1909*a*, 1909*b*, 1909*c* can include networking equipment configured to provide internal and external communications for the computing clusters. For example, cluster routers 1911*a* in computing cluster 1909*a* can include one or more internet switching and routing devices configured to provide (i) local area network communications between computing devices 1900*a* and cluster storage arrays 1910*a* via local cluster network 1912*a*, and (ii) wide area network communications between computing cluster 1909*a* and computing clusters 1909*b* and 1909*c* via wide area network link 1913*a* to network 1706. Cluster routers 1911*b* and 1911*c* can include network equipment similar to cluster routers 1911*a*, and cluster routers 1911*b* and 1911*c* can perform similar networking functions for computing clusters 1909*b* and 1909*b* that cluster routers 1911*a* perform for computing cluster 1909*a*.

In some embodiments, the configuration of cluster routers 1911*a*, 1911*b*, 1911*c* can be based at least in part on the data communication requirements of the computing devices and cluster storage arrays, the data communications capabilities of the network equipment in cluster routers 1911*a*, 1911*b*, 1911*c*, the latency and throughput of local cluster networks 1912*a*, 1912*b*, 1912*c*, the latency, throughput, and cost of wide area network links 1913*a*, 1913*b*, 1913*c*, and/or other factors that can contribute to the cost, speed, fault-tolerance, resiliency, efficiency and/or other design criteria of the moderation system architecture.

Example Methods of Operation

FIG. 20 is a flowchart of a method 2000, in accordance with example embodiments. Method 2000 can be executed by a computing device, such as computing device 1700. Method 2000 can begin at block 2010, where the computing device can apply a geometry model to an input image to determine a surface orientation map indicative of a distribution of lighting on an object in the input image based on a surface geometry of the object, such as discussed above at least in the context of FIGS. 2-5.

At block 2020, the computing device can apply an environmental light estimation model to the input image to determine a direction of synthetic lighting to be applied to the input image to enhance at least a portion of the input image, such as discussed above at least in the context of FIGS. 2, 6, and 7.

At block 2030, the computing device can apply, based on the surface orientation map and the direction of synthetic lighting to be applied, a light energy model to determine a quotient image indicative of an amount of light energy to be applied to each pixel of the input image, such as discussed above at least in the context of FIGS. 2, 9-11.

At block 2040, the computing device can enhance, based on the quotient image, the portion of the input image, such as discussed above at least in the context of FIGS. 2-15.

Some embodiments involve training a neural network to perform one or more of: (1) apply the geometry model to predict the surface orientation map, (2) apply the environmental light estimation model to determine the direction of the synthetic lighting, or (3) apply the light energy model to predict the quotient image. In some embodiments, the neural network is trained to apply the geometry model to predict the surface orientation map, and the embodiments may involve predicting the surface orientation map by using the trained neural network. In some embodiments, the neural network is trained to apply the environmental light estimation model to determine the direction of the synthetic lighting, and the embodiments may involve predicting the direction of the synthetic lighting by using the trained neural network. In some embodiments, the neural network is trained to apply the light energy model to predict the quotient image, and the embodiments may involve predicting the quotient by using the trained neural network.

In some embodiments, the applying of the environmental light estimation model involves detecting, by the computing device, a pose of the object in the input image. The determining of the direction of the synthetic lighting can be based on the pose.

Some embodiments involve generating, by the computing device and based on the surface orientation map and the direction of synthetic lighting, a light visibility map. The quotient image may be based on the light visibility map.

In some embodiments, the enhancing of the portion of the input image involves determining, by the computing device, a request to enhance the portion of the input image. Such embodiments may also involve sending the request to enhance the portion of the input image from the computing device to a second computing device, the second computing device comprising the trained neural network. Such embodiments may also involve, after sending the request, the computing device receiving, from the second computing device, an output image that applies the quotient image to enhance the portion of the input image.

In some embodiments, the training of the neural network involves utilizing a plurality of images of the object. The plurality of images may utilize a plurality of illumination profiles to light the object.

Some embodiments involve receiving, by the computing device, a user preference for the direction of the synthetic lighting to be applied to the particular input image.

In some embodiments, the object may have a characteristic of diffusely reflecting light.

In some embodiments, the computing device may include a camera. Such embodiments involve generating the input image of the object using the camera. Such embodiments may also involve receiving, at the computing device, the generated input image from the camera.

Some embodiments involve providing the portion of the enhanced input image using the computing device.

Some embodiments involve predicting an illumination profile of the input image using the environmental light estimation model. Such embodiments involve providing the predicted illumination profile using the computing device.

In some embodiments, the prediction of the illumination profile involves generating a high dynamic range (HDR) lighting environment based on low dynamic range (LDR) images of a set of reference objects, each of the set of reference objects having a respective bidirectional reflectance distribution function (BRDF). In such embodiments, the set of reference objects may include one or more of a mirror ball, a matte silver ball, or a gray diffuse ball.

In some embodiments, the predicting involves obtaining the trained neural network at the computing device. Such embodiments involve applying the obtained neural network at the computing device.

In some embodiments, the training of the neural network includes training the neural network at the computing device.

Some embodiments involve adjusting the quotient image to apply one or more of: (i) a compensation for an exposure level in the input image, (ii) a compensation for a brightness level in the input image, or (iii) a matting refinement to the particular input image.

Additional Example Embodiments

The following clauses are offered as further description of the disclosure.

Clause 1—A computer-implemented method, including: training a neural network to apply an environmental light estimation model to an input image to optimize a direction of synthetic lighting to be applied to the input image to enhance at least a portion of the input image; detecting, by a computing device, a pose of an object in a particular input image; and predicting, by the computing device and based on the pose, a direction of synthetic lighting to be applied to the input image by using the trained neural network to apply the predicted environmental light estimation model to the particular input image.

Clause 2—The computer-implemented method of clause 1, further including: applying the optimized direction of synthetic lighting to the particular input image to enhance the portion of the particular input image.

Clause 3—The computer-implemented method of clause 2, wherein applying the optimized direction of synthetic lighting to the particular input image includes: determining, by the computing device, a request to enhance the particular input image; sending the request to enhance the particular input image from the computing device to a second computing device, the second computing device including the trained neural network; and after sending the request, the computing device receiving, from the second computing device, an output image that applies the optimized direction of synthetic lighting to the particular input image.

Clause 4—The computer-implemented method of any one of clauses 1-3, wherein an illumination profile of the input image is modeled using a light estimation model, and wherein predicting the optimal direction from which to add synthetic lighting further comprises estimating an original illumination profile for the input image.

Clause 5—The computer-implemented method of any one of clauses 1-4, wherein the particular input image includes a portrait, and the method further including: detecting a face in the portrait; and determining the pose of the object by determining ahead pose of the face.

Clause 6—The computer-implemented method of any one of clauses 1-5, wherein training the neural network to apply the environmental light estimation model comprises training the neural network using a plurality of images of the object, where the plurality of images utilize a plurality of illumination profiles to light the object.

Clause 7—The computer-implemented method of any one of clauses 1-6, wherein the neural network is a convolutional neural network.

Clause 8—The computer-implemented method of any one of clauses 1-7, wherein the object comprises an object that diffusely reflects light.

Clause 9—The computer-implemented method of any one of clauses 1-8, wherein the computing device comprises a camera, and the method further including: generating the particular input image using the camera; and receiving, at the computing device, the generated particular input image from the camera.

Clause 10—The computer-implemented method of any one of clauses 1-9, further including: providing the optimized direction of synthetic lighting using the computing device.

Clause 11—The computer-implemented method of any one of clauses 1-10, wherein an illumination profile of the input image is estimated using a light estimation model, and wherein the method further including: providing a prediction of the original illumination profile using the computing device.

Clause 12—The computer-implemented method of clause 11, wherein the prediction of the illumination profile includes: generating a high dynamic range (HDR) lighting environment based on low dynamic range (LDR) images of a set of reference objects, each of the set of reference objects having a respective bidirectional reflectance distribution function (BRDF).

Clause 13—The computer-implemented method of clause 12, wherein the set of reference objects includes one or more of a mirror ball, a matte silver ball, or a gray diffuse ball.

Clause 14—The computer-implemented method of any one of clauses 1-13, wherein optimizing the direction of synthetic lighting by using the trained neural network comprises: obtaining the trained neural network at the computing device; and determining the direction of synthetic lighting by the computing device using the obtained neural network.

Clause 15—The computer-implemented method of clause 14, wherein training the neural network comprises training the neural network at the computing device.

Clause 16—The computer-implemented method of any one of clauses 1-15, further including: applying, by the computing device, a geometry model to the particular input image to determine a surface orientation map indicative of a distribution of lighting on the object in the particular input image based on a surface geometry of the object.

Clause 17—The computer-implemented method of any one of clauses 1-16, further including: applying, by the computing device and based on a surface geometry of the object in the particular image and the optimized direction of synthetic lighting, a light energy model to determine a quotient image indicative of an amount of light energy to be applied to each pixel of the particular input image.

Clause 18—The computer-implemented method of clause 17, further including: enhancing, based on the quotient image, the portion of the particular input image.

Clause 19—A computing device, including: one or more processors; and data storage, wherein the data storage has stored thereon computer-executable instructions that, when executed by the one or more processors, cause the computing device to carry out functions including the computer-implemented method of any one of clauses 1-18.

Clause 20—An article of manufacture including one or more computer readable media having computer-readable instructions stored thereon that, when executed by one or more processors of a computing device, cause the computing device to carry out functions that comprise the computer-implemented method of any one of clauses 1-18.

Clause 21—The article of manufacture of clause 20, wherein the one or more computer readable media comprise one or more non-transitory computer readable media.

Clause 22—A computing device, including: means for carrying out the computer-implemented method of any one of clauses 1-18.

Clause 23—A computer-implemented method, including: training a neural network to apply a geometry model to an input image to predict a surface orientation map indicative of a distribution of lighting on an object in the input image based on a surface geometry of the object; predicting, by a computing device, a surface orientation map by using the trained neural network to apply the geometry model to a particular object in a particular input image based on a particular surface geometry of the particular object; receiving, by the computing device, an indication of a direction of synthetic lighting to be applied to the particular input image to enhance at least a portion of the particular input image; and generating, by the computing device and based on the predicted surface orientation map and the indicated direction of synthetic lighting, a light visibility map for the particular input image, wherein the light visibility map is indicative of synthetic lighting to be applied to the particular input image based on the particular surface geometry of the particular object.

Clause 24—The computer-implemented method of clause 23, further including: applying the generated light visibility map to the particular input image to enhance at least a portion of the particular input image.

Clause 25—The computer-implemented method of clause 24, wherein applying the generated light visibility map to the particular input image comprises: determining, by the computing device, a request to enhance the particular input image; sending the request to enhance the particular input image from the computing device to a second computing device, the second computing device including the trained neural network; and after sending the request, the computing device receiving, from the second computing device, an output image that applies the generated light visibility map to the particular input image.

Clause 26—The computer-implemented method of any one of clauses 23-25, wherein training the neural network to apply the geometry model comprises training the neural network using a plurality of images of the object, where the plurality of images utilize a plurality of illumination profiles to light the object.

Clause 27—The computer-implemented method of any one of clauses 23-26, wherein the neural network is a convolutional neural network.

Clause 28—The computer-implemented method of any one of clauses 23-27, wherein the object comprises an object that diffusely reflects light.

Clause 29—The computer-implemented method of any one of clauses 23-28, wherein the computing device comprises a camera, and the method further including: generating the particular input image of the object using the camera; and receiving, at the computing device, the generated particular input image from the camera.

Clause 30—The computer-implemented method of any one of clauses 23-29, wherein receiving the indication of a direction of synthetic lighting includes: receiving, by the computing device, a user preference for the direction of synthetic lighting.

Clause 31—The computer-implemented method of any one of clauses 23-29, wherein receiving the indication of a direction of synthetic lighting comprises: training a second neural network to apply an environmental light estimation model to the input image to optimize a direction of synthetic lighting; detecting, by the computing device, a pose of the particular object in the particular input image; and optimizing, by the computing device and based on the pose, the direction of synthetic lighting by using the trained second neural network to apply the environmental light estimation model to the particular input image.

Clause 32—The computer-implemented method of any one of clauses 23-29, further including: providing the predicted surface orientation map using the computing device.

Clause 33—The computer-implemented method of any one of clauses 23-32, wherein an illumination profile of the input image is modeled using an original light model, and wherein the method further including: providing a prediction of the original light model using the computing device.

Clause 34—The computer-implemented method of clause 33, wherein the prediction of the illumination profile comprises: generating a high dynamic range (HDR) lighting environment based on low dynamic range (LDR) images of a set of reference objects, each of the set of reference objects having a respective bidirectional reflectance distribution function (BRDF).

Clause 35—The computer-implemented method of clause 34, wherein the set of reference objects includes one or more of a mirror ball, a matte silver ball, or a gray diffuse ball.

Clause 36—The computer-implemented method of any one of clauses 23-35, wherein predicting the surface orientation map by using the trained neural network comprises: obtaining the trained neural network at the computing device; and determining the surface orientation map by the computing device using the obtained neural network.

Clause 37—The computer-implemented method of clause 36, wherein training the neural network comprises training the neural network at the computing device.

Clause 38—The computer-implemented method of any one of clauses 23-37, further including: applying, by the computing device and based on the surface orientation map and the direction of synthetic lighting, a light energy model to determine a quotient image indicative of an amount of light energy to be applied to each pixel of the particular input image.

Clause 39—The computer-implemented method of clause 38, further including: enhancing, based on the quotient image, the portion of the input image.

Clause 40—A computing device, including: one or more processors; and data storage, wherein the data storage has stored thereon computer-executable instructions that, when executed by the one or more processors, cause the computing device to carry out functions including the computer-implemented method of any one of clauses 23-39.

Clause 41—An article of manufacture including one or more computer readable media having computer-readable instructions stored thereon that, when executed by one or more processors of a computing device, cause the computing device to carry out functions that comprise the computer-implemented method of any one of clauses 23-39.

Clause 42—The article of manufacture of clause 41, wherein the one or more computer readable media comprise one or more non-transitory computer readable media.

Clause 43—A computing device, including: means for carrying out the computer-implemented method of any one of clauses 23-39.

Clause 44—A computer-implemented method, including: training a neural network to apply a light energy model to an input image to predict a quotient image indicative of an amount of light energy to be applied to each pixel of the input image; receiving, by the computing device, a light visibility map for a particular input image, wherein the light visibility map is indicative of synthetic lighting to be applied to the particular input image based on a surface geometry of an object in the particular input image; and predicting, by a computing device, a quotient image by using the trained neural network to apply the light energy model to the particular input image.

Clause 45—The computer-implemented method of clause 44, further including: applying the predicted quotient image to the particular input image to enhance at least a portion of the particular input image.

Clause 46—The computer-implemented method of any one of clauses 44 or 45, further including: adjusting the quotient image to compensate for an exposure level in the particular input image.

Clause 47—The computer-implemented method of any one of clauses 44-46, further including: adjusting the quotient image to compensate for a brightness level in the particular input image.

Clause 48—The computer-implemented method of any one of clauses 44-47, further including: adjusting the quotient image to apply a matting refinement to the particular input image.

Clause 49—The computer-implemented method of any one of clauses 45-49, wherein predicting quotient image comprises: determining, by the computing device, a request to enhance the particular input image; sending the request to enhance the particular input image from the computing device to a second computing device, the second computing device including the trained neural network; and after sending the request, the computing device receiving, from the second computing device, an output image that applies the predicted quotient image to the particular input image.

Clause 50—The computer-implemented method of any one of clauses 44-49, wherein training the neural network to apply the light energy model comprises training the neural network using a plurality of images of the object, where the plurality of images utilize a plurality of illumination profiles to light the object.

Clause 51—The computer-implemented method of any one of clauses 44-50, wherein the neural network is a convolutional neural network.

Clause 52—The computer-implemented method of any one of clauses 44-51, wherein the object comprises an object that diffusely reflects light.

Clause 53—The computer-implemented method of any one of clauses 44-52, wherein the computing device comprises a camera, and the method further including: generating the particular input image of the object using the camera; and receiving, at the computing device, the generated particular input image from the camera.

Clause 54—The computer-implemented method of any one of clauses 44-53, further including: receiving, by the computing device, a user preference for a direction of the synthetic lighting to be applied to the particular input image.

Clause 55—The computer-implemented method of any one of clauses 44-54 further including: training a second neural network to apply an environmental light estimation model to the input image to optimize a direction of the synthetic lighting; detecting, by the computing device, a pose of the object in the particular input image; and optimizing, by the computing device and based on the pose, the direction of the synthetic lighting by using the trained second neural network to apply the environmental light estimation model to the particular input image.

Clause 56—The computer-implemented method of any one of clauses 44-55, further including: applying, by the computing device, a geometry model to the particular input image to determine a surface orientation map indicative of a distribution of lighting on the object in the particular input image based on a surface geometry of the object, and wherein the light visibility map is based on the surface orientation map.

Clause 57—The computer-implemented method of any one of clauses 44-56 wherein an illumination profile of the input image is modeled using an environmental light estimation model, and wherein the method further including: providing a prediction of the illumination profile using the computing device.

Clause 58—The computer-implemented method of any one of clauses 44-57, wherein predicting the quotient image by using the trained neural network comprises: obtaining the trained neural network at the computing device; and determining the quotient image by the computing device using the obtained neural network.

Clause 59—The computer-implemented method of clause 44-58, wherein training the neural network comprises training the neural network at the computing device.

Clause 60—A computing device, including: one or more processors; and data storage, wherein the data storage has stored thereon computer-executable instructions that, when executed by the one or more processors, cause the computing device to carry out functions including the computer-implemented method of any one of clauses 44-59.

Clause 61—An article of manufacture including one or more computer readable media having computer-readable instructions stored thereon that, when executed by one or more processors of a computing device, cause the computing device to carry out functions that comprise the computer-implemented method of any one of clauses 44-59.

Clause 62—The article of manufacture of clause 61, wherein the one or more computer readable media comprise one or more non-transitory computer readable media.

Clause 63—A computing device, including: means for carrying out the computer-implemented method of any one of clauses 44-59.

Clause 64—A computer-implemented method, including: applying, by a computing device, a geometry model to an input image to determine a surface orientation map indicative of a distribution of lighting on an object in the input image based on a surface geometry of the object; applying, by the computing device, an environmental light estimation model to the input image to determine an optimal direction of synthetic lighting to be applied to the input image to enhance at least a portion of the input image; applying, by the computing device and based on the surface orientation map and the optimal direction of synthetic lighting, a light energy model to determine a quotient image indicative of an amount of light energy to be applied to each pixel of the input image; and enhancing, based on the quotient image, the portion of the input image.

Clause 65—The computer-implemented method of clause 64, wherein applying the geometry model comprises: training a neural network to apply the geometry model to predict the surface orientation map; and predicting the surface orientation map by using the trained neural network.

Clause 66—The computer-implemented method of any one of clauses 64 or 65, wherein applying the environmental light estimation model comprises: training a neural network to apply the environmental light estimation model to optimize the direction of the synthetic lighting; and optimizing, by the computing device, the direction of the synthetic lighting by using the trained neural network.

Clause 67—The computer-implemented method of any one of clauses 64-66, wherein applying the light energy model comprises: training a neural network to apply the light energy model to predict the quotient image; and predicting the quotient by using the trained neural network.

Clause 68—The computer-implemented method of any one of clauses 64-67, further including: generating, by the computing device and based on the surface orientation map and the direction of synthetic lighting, a light visibility map, and wherein the quotient image is based on the light visibility map.

Clause 69—The computer-implemented method of any one of clauses 64-68, wherein enhancing the portion of the input image comprises: determining, by the computing device, a request to enhance the input image; sending the request to enhance the input image from the computing device to a second computing device, the second computing device including the trained neural network; and after sending the request, the computing device receiving, from the second computing device, an output image that applies the quotient image to enhance the portion of the input image.

Clause 70—The computer-implemented method of any one of clauses 65-68, further including: training the neural network using a plurality of images of the object, where the plurality of images utilize a plurality of illumination profiles to light the object.

Clause 71—The computer-implemented method of any one of clauses 65-68, or 70, wherein the neural network is a convolutional neural network.

Clause 72—The computer-implemented method of any one of clauses 64-71, wherein the object comprises an object that diffusely reflects light.

Clause 73—The computer-implemented method of any one of clauses 64-72, wherein the computing device comprises a camera, and the method further including: generating the input image of the object using the camera; and receiving, at the computing device, the generated input image from the camera.

Clause 74—The computer-implemented method of any one of clauses 64-73, further including: providing the enhanced input image using the computing device.

Clause 75—The computer-implemented method of any one of clauses 64-74, wherein an illumination profile of the input image is modeled using an environmental light estimation model, and wherein the method further including: providing a prediction of the illumination profile using the computing device.

Clause 76—The computer-implemented method of clause 75, wherein the prediction of the illumination profile includes: generating a high dynamic range (HDR) lighting environment based on low dynamic range (LDR) images of a set of reference objects, each of the set of reference objects having a respective bidirectional reflectance distribution function (BRDF).

Clause 77—The computer-implemented method of clause 76, wherein the set of reference objects includes one or more of a mirror ball, a matte silver ball, or a gray diffuse ball.

Clause 78—The computer-implemented method of any one of clauses 65-67 or 70-71, wherein the predicting using the trained neural network comprises: obtaining the trained neural network at the computing device; and applying the obtained neural network at the computing device.

Clause 79—The computer-implemented method of clause 65-66 or 70-71, wherein training the neural network comprises training the neural network at the computing device.

Clause 80—A computing device, including: one or more processors; and data storage, wherein the data storage has stored thereon computer-executable instructions that, when executed by the one or more processors, cause the computing device to carry out functions including the computer-implemented method of any one of clauses 64-79.

Clause 81—An article of manufacture including one or more computer readable media having computer-readable instructions stored thereon that, when executed by one or more processors of a computing device, cause the computing device to carry out functions that comprise the computer-implemented method of any one of clauses 64-79.

Clause 82—The article of manufacture of clause 81, wherein the one or more computer readable media comprise one or more non-transitory computer readable media.

Clause 83—A computing device, including: means for carrying out the computer-implemented method of any one of clauses 64-79.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
    determining, by a geometry model of a computing device, a surface orientation map based on a prediction of lighting on an object in an input image based on a surface geometry of the object;
    determining, by an environmental light estimation model of the computing device, a direction of synthetic lighting to be applied to the input image to modify at least a portion of the input image;
    determining, by a light energy model of the computing device and based on the surface orientation map and the direction of synthetic lighting, a quotient image indicative of an amount of light energy to be applied to each pixel of the input image; and
    modifying, based on a product of the quotient image and the input image, the portion of the input image.

2. The computer-implemented method of claim 1, wherein the determining of the direction of synthetic lighting comprises:
    detecting, by the computing device, a pose of the object in the input image, and
    wherein the determining of the direction of the synthetic lighting is based on the pose.

3. The computer-implemented method of claim 1, further comprising:
    generating, by the computing device and based on the surface orientation map and the direction of synthetic lighting, a light visibility map, and
    wherein the determining of the quotient image is based on the light visibility map.

4. The computer-implemented method of claim 1, wherein the modifying of the portion of the input image comprises:
    determining, by the computing device, a request to modify the portion of the input image;
    sending the request to request to modify the portion of the input image from the computing device to a second computing device, the second computing device comprising a trained neural network; and
    after sending the request, the computing device receiving, from the second computing device, an output image that applies the quotient image to modify the portion of the input image.

5. The computer-implemented method of claim 1, wherein the determining of the direction of synthetic lighting comprises:
receiving, by the computing device, a user preference for the direction of the synthetic lighting to be applied to the input image.

6. The computer-implemented method of claim 1, wherein the object has a characteristic of diffusely reflecting light.

7. The computer-implemented method of claim 1, wherein the computing device comprises a camera, and the method further comprising:
generating the input image of the object using the camera; and
receiving, at the computing device, the generated input image from the camera.

8. The computer-implemented method of claim 1, further comprising:
providing the portion of the modified input image using the computing device.

9. The computer-implemented method of claim 1, further comprising:
predicting an illumination profile of the input image using the environmental light estimation model; and
providing the predicted illumination profile using the computing device.

10. The computer-implemented method of claim 9, wherein the prediction of the illumination profile comprises:
generating a high dynamic range (HDR) lighting environment based on low dynamic range (LDR) images of a plurality of reference objects, each of the reference objects having a respective bidirectional reflectance distribution function (BRDF).

11. The computer-implemented method of claim 10, wherein the set of reference objects includes one or more of a mirror ball, a matte silver ball, or a gray diffuse ball.

12. The computer-implemented method of claim 1, further comprising:
adjusting the quotient image to apply one or more of: (i) a first compensation for an exposure level in the input image, (ii) a second compensation for a brightness level in the input image, or (iii) a matting refinement to the input image.

13. A computing device, comprising:
one or more processors; and
data storage, wherein the data storage has stored thereon computer-executable instructions that, when executed by the one or more processors, cause the computing device to carry out functions comprising:
determining, by a geometry model of the computing device, a surface orientation map based on a prediction of lighting on an object in an input image based on a surface geometry of the object;
determining, by an environmental light estimation model of the computing device, a direction of synthetic lighting to be applied to the input image to modify at least a portion of the input image;
determining, by a light energy model of the computing device and based on the surface orientation map and the direction of synthetic lighting, a quotient image indicative of an amount of light energy to be applied to each pixel of the input image; and
modifying, based on a product of the quotient image and the input image, the portion of the input image.

14. An article of manufacture comprising one or more computer readable media having computer-readable instructions stored thereon that, when executed by one or more processors of a computing device, cause the computing device to carry out functions comprising:
determining, by a geometry model of the computing device, a surface orientation map based on a prediction of lighting on an object in an input image based on a surface geometry of the object;
determining, by an environmental light estimation model of the computing device, a direction of synthetic lighting to be applied to the input image to modify at least a portion of the input image;
determining, by a light energy model of the computing device and based on the surface orientation map and the direction of synthetic lighting, a quotient image indicative of an amount of light energy to be applied to each pixel of the input image; and
modifying, based on a product of the quotient image and the input image, the portion of the input image.

15. The computer-implemented method of claim 1, wherein at least a part of one or more of the geometry model, the environmental light estimation model, or the light energy model is part of a machine learning model.

16. The computer-implemented method of claim 15, further comprising:
training the machine learning model to perform one or more of: (1) predict the surface orientation map, (2) predict the direction of the synthetic lighting, or (3) predict the quotient image.

17. The computer-implemented method of claim 15, wherein the machine learning model is trained to predict the surface orientation map, and the method further comprising:
predicting the surface orientation map by using the trained machine learning model.

18. The computer-implemented method of claim 15, wherein the machine learning model is trained to predict the direction of the synthetic lighting, and the method further comprising:
predicting the direction of the synthetic lighting by using the trained machine learning model.

19. The computer-implemented method of claim 15, wherein the machine learning model is trained to predict the quotient image, and the method further comprising:
predicting the quotient image by using the trained machine learning model.

20. The computer-implemented method of claim 15, wherein the training of the machine learning model is based on a training dataset comprising a plurality of images of the object, wherein the plurality of images utilize a plurality of illumination profiles to illuminate the object.

21. The computer-implemented method of claim 15, wherein the training of the machine learning model comprises training the machine learning model at the computing device.

* * * * *